United States Patent
Ojima et al.

(10) Patent No.: US 8,009,903 B2
(45) Date of Patent: Aug. 30, 2011

(54) IMAGE PROCESSOR, IMAGE PROCESSING METHOD, STORAGE MEDIUM, AND INTEGRATED CIRCUIT THAT CAN ADJUST A DEGREE OF DEPTH FEELING OF A DISPLAYED HIGH-QUALITY IMAGE

(75) Inventors: Shuichi Ojima, Osaka (JP); Tatsumi Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 1067 days.

(21) Appl. No.: 11/819,450

(22) Filed: Jun. 27, 2007

(65) Prior Publication Data

US 2008/0002910 A1 Jan. 3, 2008

(30) Foreign Application Priority Data

Jun. 29, 2006 (JP) ................................ 2006-179125

(51) Int. Cl.
  *G06K 9/00* (2006.01)
  *G06F 17/00* (2006.01)
(52) U.S. Cl. ........................ 382/167; 382/162; 345/418
(58) Field of Classification Search .......... 382/162–167, 382/106; 358/518–523; 340/815.4; 348/253; 345/418–420
  See application file for complete search history.

(56) References Cited

U.S. PATENT DOCUMENTS

| | | | |
|---|---|---|---|
| 5,510,875 A * | 4/1996 | Yamamoto et al. | 396/147 |
| 5,577,191 A * | 11/1996 | Bonomi | 345/502 |
| 5,621,495 A * | 4/1997 | Yamamoto et al. | 396/89 |
| 5,684,890 A * | 11/1997 | Miyashita et al. | 382/154 |
| 5,751,829 A * | 5/1998 | Ringland et al. | 382/100 |
| 5,768,461 A * | 6/1998 | Svetkoff et al. | 385/116 |
| 5,822,486 A * | 10/1998 | Svetkoff et al. | 385/116 |
| 6,087,617 A * | 7/2000 | Troitski et al. | 219/121.6 |
| 6,201,566 B1 * | 3/2001 | Harada et al. | 348/51 |
| 6,232,974 B1 * | 5/2001 | Horvitz et al. | 345/419 |
| 6,754,400 B2 * | 6/2004 | Florin et al. | 382/285 |

(Continued)

FOREIGN PATENT DOCUMENTS

JP 2004-159148 6/2004

OTHER PUBLICATIONS

Yamada et al. "Objective Evaluation of the Feeling of Depth in 2d or 3d images using the convergence angle of the eyes" ATR Auditory and Visual Perception Research Labs, SPIE vol. 1453 (1991) pp. 1-7.*

(Continued)

*Primary Examiner* — Jason M Repko
*Assistant Examiner* — Mia M Thomas
(74) *Attorney, Agent, or Firm* — Wenderoth, Lind & Ponack, L.L.P.

(57) ABSTRACT

It is an object of the invention to realize an image processor that allows the user to designate the degree of depth feeling with his single operation. An image processor includes an image data input unit, a depth data input unit, a depth degree input unit, a depth feeling correction unit, and an image data output unit. The image processor controls, in accordance with the depth data and depth degree, the gain of the depth feeling correction, so that the user can freely adjust the depth feeling degree. The process of the depth feeling degree archives both of the near view process and the distant view process, and the adjustment is carried out with the one-dimensional parameter.

28 Claims, 24 Drawing Sheets

U.S. PATENT DOCUMENTS

| | | | |
|---|---|---|---|
| 7,064,753 B2* | 6/2006 | Ohba et al. | 345/419 |
| 7,072,510 B2* | 7/2006 | Pettigrew | 382/167 |
| 7,123,380 B2* | 10/2006 | Van de Capelle | 358/1.9 |
| 7,200,261 B2 | 4/2007 | Ono | 382/154 |
| 7,529,401 B2* | 5/2009 | Kagitani | 382/154 |
| 7,545,386 B2* | 6/2009 | Marsyla et al. | 345/600 |
| 7,554,553 B2* | 6/2009 | MacInnis et al. | 345/589 |
| 7,558,420 B2* | 7/2009 | Era | 382/154 |
| 7,668,366 B2* | 2/2010 | Bhaskaran et al. | 382/164 |
| 7,672,526 B2* | 3/2010 | Kondo et al. | 382/254 |
| 7,672,536 B2* | 3/2010 | Kondo et al. | 382/276 |
| 7,692,662 B2* | 4/2010 | Ohba | 345/584 |
| 7,715,596 B2* | 5/2010 | Gehlen et al. | 382/118 |
| 7,729,526 B2* | 6/2010 | George et al. | 382/131 |
| 7,756,325 B2* | 7/2010 | Vetter et al. | 382/154 |
| 7,855,802 B2* | 12/2010 | Newman et al. | 358/1.16 |
| 7,865,013 B2* | 1/2011 | Hack | 382/167 |
| 7,869,649 B2* | 1/2011 | Watanabe et al. | 382/162 |
| 2001/0017627 A1* | 8/2001 | Marsden et al. | 345/501 |
| 2002/0028014 A1* | 3/2002 | Ono | 382/154 |
| 2002/0181800 A1* | 12/2002 | Hamada et al. | 382/266 |
| 2003/0002735 A1* | 1/2003 | Yamamoto et al. | 382/167 |
| 2003/0095700 A1* | 5/2003 | Yu et al. | 382/154 |
| 2004/0246267 A1* | 12/2004 | Oohara | 345/591 |
| 2005/0254702 A1* | 11/2005 | Era | 382/154 |
| 2005/0283058 A1* | 12/2005 | Choo-Smith et al. | 600/315 |
| 2006/0159364 A1* | 7/2006 | Poon et al. | 382/275 |
| 2007/0110333 A1* | 5/2007 | Kondo et al. | 382/276 |
| 2007/0115286 A1* | 5/2007 | Kondo et al. | 345/426 |
| 2007/0262985 A1* | 11/2007 | Watanabe et al. | 345/420 |
| 2007/0273686 A1* | 11/2007 | Watanabe et al. | 345/419 |
| 2008/0002910 A1* | 1/2008 | Ojima et al. | 382/277 |
| 2008/0075381 A1* | 3/2008 | Ishimaru | 382/266 |
| 2008/0211686 A1* | 9/2008 | Arai | 340/815.4 |
| 2009/0022396 A1* | 1/2009 | Watanabe et al. | 382/167 |
| 2010/0080448 A1* | 4/2010 | Tam et al. | 382/154 |
| 2010/0128034 A1* | 5/2010 | Han et al. | 345/422 |
| 2011/0109620 A1* | 5/2011 | Hong et al. | 345/419 |

OTHER PUBLICATIONS

Watanabe et al. "High Quality Color Correction Method Combining Neural Networks with Genetic Algorithms" IEEE (2001) pp. 1-4.*

Shanin et al. "Color Calibration of Scanners for Scanner Independent Grain Grading" American Association of Cereal Chemists, Inc. vol. 80, No. 3, (2003) pp. 1-5.*

* cited by examiner

IMAGE PROCESSOR, IMAGE PROCESSING METHOD, STORAGE MEDIUM, AND INTEGRATED CIRCUIT THAT CAN ADJUST A DEGREE OF DEPTH FEELING OF A DISPLAYED HIGH-QUALITY IMAGE

BACKGROUND OF THE INVENTION

1. Field of the Invention

The present invention relates to image processing techniques to display high quality images on graphic display devices such as TV that emphasize depth feeling on two-dimensional videos.

2. Description of the Related Art

As a conventional depth feeling enhancement technique, there is a technique to visually enlarge the difference between an object and a surrounding background by clarifying strong portions and weak portions in contour components (refer to Patent Document 1, for example). FIG. 2 shows a configuration diagram of an image processor (solid expression circuit) 900 that realizes a conventional depth feeling correction technique recited in the Patent Document 1.

In the image processor 900 shown in FIG. 2, data (input data) input from the input terminal is sent to an averaging circuit 101 and an edge enhancement process unit 140. The averaging circuit 101 averages the input data, and outputs the averaged data to a selector 103 via a delay circuit 102.

The edge enhancement process unit 140 includes a delay circuit 104, a contour extraction unit 105, a contour correction processing unit 106, and an adder circuit 108.

First, the contour extraction unit 105 extracts contour portions (contour components) through a digital filter, and outputs the result to the contour correction processing unit 106 and a threshold value processing unit 107. The threshold value processing unit 107 sends signals to the selector 103 for deciding the selection by the selector 103 in accordance with threshold value setting signal from the threshold value setting signal input terminal 120. The original signal delayed at the delay circuit 104 (signal corresponding to the input data) and contour components whose gain is adjusted by the contour correction processing unit 106 are added by the adder circuit 108, so that the added signal is output to the selector 103.

The selector 103 selects one from among the two input signals, i.e., the averaged data output from the delay circuit 102 and the edge enhancement data output from the adder circuit 108 in accordance with the selection signal from the threshold value processing unit 107, and outputs the selected one to an output terminal 130.

In the image processor 900 described as above, adaptively selecting one of the edge enhancement signal and the averaged signal makes it possible to clarify the difference between a portion having shapely defined contours forming a near view and a weak portion forming a distant view in the image, thereby making the image looking three-dimensional.

Patent Document 1 Unexamined Patent Publication JP2004-159148A (ninth page, FIG. 1)

However, in the conventional image processor 900, when the threshold value is changed in accordance with the threshold value setting signal, degree of alternative selection between the averaged data and the edge enhancement data is changed. For example, in the image processor 900, if the threshold value is lowered, an area to be judged to be an image whose edges should be enhanced increases and sizes (ratio) of the area to be enhanced and the area to be averaged is changed. However, in the conventional techniques, changes according to the above-described alteration is not applied to each of processes of changing degree of depth feeling generated by the difference in the degree of edge enhancement between the enhanced data and the averaged data.

Accordingly, if the depth feeling enhancement is considered to be TV image quality adjustment function, it has a problem that the user can not adjust the degree of depth feeling based on his or her preference.

The present invention is provided to solve the conventional problem, and it is an object of the present invention to provide an image processor, an image processing method, a program, a storage medium and an integrated circuit that can adjust the degree of depth feeling by the operation according to a one-dimensional parameter.

SUMMARY OF THE INVENTION

An image processor according to a first aspect of the invention comprises an image data input unit, a depth data input unit, a depth degree input unit, and a depth feeling correction unit. The image data input unit receives an image data signal that can form an image constituted by pixels. The depth data input unit receives depth data that corresponds to the image data signal. The depth degree input unit receives a one-dimensional signal that is used to control depth feeling of the image formed by the image data signal. The depth feeling correction unit performs depth feeling correction on the image data signal based on the one-dimensional signal.

In this image processor, the depth degree input unit receives the one-dimensional signal that is used to control the depth feeling, and the depth feeling correction unit performs, based on the one-dimensional signal, the depth feeling correction process on the image data signal.

Accordingly, the user can input the one-dimensional signal from the depth degree input unit by operating the one-dimensional parameter, i.e., the user can easily perform the depth feeling correction on the image data signal. In addition, the user can easily adjust degree of depth feeling in the image to be processed in the image processor to his taste by his or her single operation.

It should be noted that "depth data that corresponds to the image data signal" means depth data of the pixels constituting two-dimensional image formed by the image data signal (or areas consisting of a plurality of pixels (blocks)), and, for example, for pixels whose pixel position on the two-dimensional image (pixel position) is (i, j), the depth data associated with the pixel position (i, j) corresponds to this. "Depth data" means value to be set for each of the pixels or blocks divided from the image, and indicates, for example, in a case of two-dimensional image obtained by photographing an actual three-dimensional space by a camera, degree of the distance between a position in the actual three-dimensional space corresponding to the pixels on the two-dimensional image (or blocks) and a position of the camera in the three-dimensional space.

According to a second aspect of the invention depending on the first aspect, the depth feeling correction unit includes a contour correction gain setting unit, a contour correction unit, a blur correction gain setting unit, a blur correction unit, and a selection unit. The contour correction gain setting unit is configured for setting contour correction gain based on the depth data and the one-dimensional signal. The contour correction unit is configured for performing contour correction on the image data signal based on the contour correction gain. The blur correction gain setting unit is configured for setting a parameter for blur correction based on the depth data and the one-dimensional signal. The blur correction unit is configured for performing blur correction on the image data signal based on the parameter for blur correction. The selection unit is configured for selecting, based on the depth data and the one-dimensional signal, one of the image data signal that is corrected by the contour correction unit and the image data signal that is corrected by the blur correction unit.

In the image processor, based on the depth data and one-dimensional signal, the contour correction process can be performed in accordance with the contour correction gain set by the contour correction gain setting unit; and, based on the depth data and one-dimensional signal, the blur correction process can be performed in accordance with the parameter for blur correction set by the blur correction gain setting unit. Then, based on the depth data and one-dimensional signal, the selection process by the selection unit is controlled.

Accordingly, it is easy to adjust, in the image processor, based on the one-dimensional signal, the intensity (degree) of the contour correction process and blur correction process to be performed on the image data signal.

According to a third aspect of the invention depending on the second aspect, the contour correction gain setting unit sets the contour correction gain such that as value of the one-dimensional signal increases, a difference increases between contour correction gain for a near view area on the image where value of the depth data is small and contour correction gain for a distant view area on the image where value of the depth data is large.

Accordingly, when the user increases the value of the one-dimensional signal, the contour of the near view area in the image to be processed (processing image) in the image processor is enhanced and the depth feeling effect is enhanced in the processing image.

It should be noted that "near view area" is, for example, an area in the image including pixels having depth data whose value is smaller than the predetermined threshold value T1 (Smaller value of the depth data indicates a nearer view.), in the depth data distribution obtained for depth data of all of the pixels constituting images. "Distant view area" is, for example, an area in the image containing pixel having the depth data whose value is larger than the predetermined threshold value T2 (>T1), in the depth data distribution obtained for depth data of all of the pixels constituting images. The threshold values T1 and T2 of the depth data can be the same. In addition, "near view area" and "distant view area" can be relatively decided.

According to a fourth aspect of the invention depending on the second aspect, the blur correction gain setting unit sets the parameter for blur correction such that if the depth data is in the rage from Z0 to Z2 (>Z0), regardless of value of the one-dimensional signal, the blur process is not performed; and if the depth data exceeds Z2, as the value of the one-dimensional signal increases, a difference increases between the degree of the blur process when the value of the depth data is Z2 and the degree of the blur process when the value of the depth data is Z1 (>Z2).

Accordingly, as the value of the one-dimensional signal increases, the degree of the blur correction process performed on the pixels in the distant view area where the depth data value is large is enhanced. Therefore, visually, it is possible for the user to feel that the distant view area is deeper, thereby enhancing the depth feeling in the processing image.

According to a fifth aspect of the invention depending on the second aspect, the selection unit selects the image data signal corrected by the contour correction unit if the value of the one-dimensional signal is equal to or smaller than first value ZT, selects the image data corrected by the contour correction unit if the value of the one-dimensional signal is larger than the first value ZT and the value of the depth data is equal to or smaller than first depth data value Z2, and selects the image data signal corrected by the blur correction unit if the value of the one-dimensional signal is larger than the first value ZT and the value of the depth data is larger than the first depth data value Z2.

Accordingly, it is possible to effectively enhance, by just changing the value of the one-dimensional signal, the depth feeling in the processing image.

According to a sixth aspect of the invention depending on the second aspect, the depth feeling correction unit further includes a color saturation correction gain setting unit that is configured for setting color saturation correction gain based on the depth data and the one-dimensional signal and a color saturation correction unit that is configured for performing color saturation correction on the image data signal based on the color saturation correction gain.

Accordingly, it is easy to adjust, by just changing the value of the one-dimensional signal, the intensity (degree) of the color saturation correction process to be performed on the image data signal.

According to a seventh aspect of the invention depending on the sixth aspect, the color saturation correction gain setting unit sets the color saturation correction gain such that as the value of the one-dimensional signal increases, a difference increases between the color saturation correction gain for a near view area in the image where the value of the depth data is small and the color saturation correction gain for a distant view area in the image where the value of the depth data is large.

Accordingly, as the value of the one-dimensional signal increases, the degree of the color saturation correction process in the pixel in the near view area where the depth data value is small is enhanced (The color saturation is enhanced). Therefore, visually, the user can feel pixels in the near view area on the image more vividly, thereby improving the depth feeling in the processing image.

According to an eighth aspect of the invention depending on the first aspect, the depth feeling correction unit includes a contrast correction gain setting unit configured for setting contrast correction gain based on the depth data and the one-dimensional signal, and a contrast correction unit configured for correcting the image data signal based on the contrast correction gain.

Accordingly, it is easy to adjust, by just changing the value of the one-dimensional signal, the intensity (degree) of the contrast correction process to be performed on the image data signal, thereby effectively enhancing the depth feeling.

According to a ninth aspect of the invention depending on the eighth aspect, the contrast correction gain setting unit sets the contrast correction gain such that as value of the one-dimensional signal increases, a difference increases between the contrast correction gain for a near view area in the image where the value of the depth data is small and contrast correction gain for a distant view area in the image where the value of the depth data is large.

Accordingly, as the value of the one-dimensional signal increases, degree of the contrast correction process on the pixel in the near view area in which the depth data value is small is enhanced (The contrast is enhanced.). Therefore, visually, the user can feel pixels in the near view area on the image more clearly, thereby enhancing the depth feeling in the processing image.

According to a tenth aspect of the invention depending on the first aspect, the depth feeling correction unit includes a shadow correction gain setting unit configured for setting shadow correction gain based on the depth data and the one-dimensional signal and a shadow correction unit configured for performing shadow correction on the image data signal based on the shadow correction gain.

Accordingly, it is easy to adjust, by just changing the value of the one-dimensional signal, the intensity (degree) of the shadow correction process to be performed on the image data signal, thereby effectively enhancing the depth feeling.

According to a eleventh aspect of the invention depending on the ninth aspect, the shadow correction gain setting unit sets the shadow correction gain such that as value of the one-dimensional signal increases, a difference increases between the shadow correction gain for the near view area in the image where the value of the depth data is small and the shadow correction gain for the distant view area in the image where the value of the depth data is large.

Accordingly, as the value of the one-dimensional signal increases, degree of the shadow correction process to be performed on the pixel in the near view area in which the depth data value is small is enhanced (The shadow is enhanced.). Therefore, visually, the shadow feel of the pixels in the near view area on the image is more enhanced, thereby enhancing the depth feeling in the processing image.

According to an twelfth aspect of the invention depending on the first aspect, if the one-dimensional signal is equal to or smaller than a predetermined value, the depth feeling correction unit performs only correction process for a near view on the image data signal; and if the one-dimensional signal is larger than the predetermined value, the depth feeling correction unit performs the correction process for a near view and the correction process for a distant view on the image data signal.

Accordingly, until the one-dimensional signal reaches the predetermined value, in accordance with the correction process for a near view, about pixels in the near view area in which the depth data value is small, a process is performed to emphasize the fact that the pixel is in the near view; and when the one-dimensional signal exceeds the predetermined value, and a process is performed on the pixels in the distant view area where the depth data value is large to emphasize the fact that the pixel is in the distant view, so that the depth feeling can be emphasized in the processing image.

It should be noted that "correction process for a near view" includes a process of enhancing contrast, a process of enhancing color saturation, and a process of enhancing shadow, for example. "Process for a distant view" includes a process of suppressing contrast, a process of suppressing color saturation, and a process of suppressing shadow, for example.

According to a thirteenth aspect of the invention depending on the first aspect, the depth feeling correction unit enlarges, as the value of the one-dimensional signal increases, a difference between correction amount of the image data signal corresponding to the pixels in the nearest view on the image and correction amount of the image data signal corresponding to the pixels in the farthest view on the image.

Accordingly, it is possible to effectively enhance the depth feeling in the image processed by this image processor.

According to a fourteenth aspect of the invention depending on the first aspect, the depth feeling correction unit keeps constant, regardless of the value of the one-dimensional signal, a difference between correction amount of the image data signal corresponding to the pixels in the nearest view on the image and correction amount of the image data signal corresponding to the pixels in the farthest view on the image.

Accordingly, it is possible to effectively enhance the depth feeling in the image processed by this image processor.

According to a fifteenth aspect of the invention depending on the twelfth aspect, the depth feeling correction unit performs an edge enhancement process as a near view area correction process for the image data signal, and performs a blur correction process as a distant view area correction process for the image data signal.

According to a sixteenth aspect of the invention depending on the twelfth aspect, the depth feeling correction unit performs a saturation enhancement process as a near view area correction process for the image data signal, and performs a color saturation lowering process as a distant view area correction process for the image data signal.

According to a seventeenth aspect of the invention depending on the first aspect, the depth feeling correction unit performs a correction process on a predetermined feature amount of the image based on the one-dimensional signal.

It should be noted that "feature quantity" is physical quantity that can be idealized for each of pixels or areas in the image, for example, and includes brightness (luminance), lightness, color saturation, hue, contrast, brightness contrast, and color contrast, for example.

According to a eighteenth aspect of the invention depending on the seventeenth aspect, the depth feeling correction unit performs a correction process on the image data signal forming an image including a first area and a second area that are distinguishable by the depth data. The depth feeling correction unit performs the correction process on the image data signal in the first area by controlling degree of enhancement of the correction process, and performs the correction process on the image data signal in the second area by controlling degree of suppression of the correction process.

According to a nineteenth aspect of the invention depending on the eighteenth aspect, the depth feeling correction unit performs the correction process on the image data signal in the first area based on the one-dimensional signal by controlling degree of enhancement of the correction process, and performs the correction process on the image data signal in the second area by controlling degree of suppression of the correction process.

Accordingly, in accordance with the one-dimensional signal, in conjunction with each other, the correction enhancement process is performed on the image data signal in the first area, and the correction suppression process is performed on image data signal in the second area.

According to a twentieth aspect of the invention depending on the eighteenth aspect, the depth feeling correction unit performs an edge enhancement process on the image data signal in the first area, and performs a blur correction process on the image data signal in the second area to blur contours.

According to a twenty-first aspect of the invention depending on the eighteenth aspect, the depth feeling correction unit performs a color saturation enhancement process on the image data signal in the first area, and performs a color saturation lowering process on the image data signal in the second area.

According to a twenty-second aspect of the invention depending on the eighteenth aspect, the depth feeling correction unit performs a contrast enhancement process on the image data signal in the first area, and performs a contrast suppression process on the image data signal in the second area.

According to a twenty-third aspect of the invention depending on the eighteenth aspect, the depth feeling correction unit performs a shadow enhancement process on the image data signal in the first area, and performs a shadow suppression process on the image data signal in the second area.

According to a twenty-fourth aspect of the invention depending on the seventeenth aspect, the depth feeling correction unit performs a correction process on the image data signal forming the image including a first area and a second area that are distinguishable by the depth data. The depth feeling correction unit performs a first correction process on the image data signal in the first area, and performs a second correction process on the image data signal in the second area that is different from the first correction process.

According to a twenty-fifth aspect of the invention depending on the twenty-fourth aspect, the depth feeling correction unit selects, as the first correction process, one from among four correction processes including a contour correction process, a color saturation correction process, a contrast correction process, and a shadow correction process; performs the selected first correction process; selects, as the second correction process, one correction process from among three correction processes of the four correction processes that are not selected in the first correction process; and performs the selected second correction process.

According to a twenty-sixth aspect of the invention depending on the twenty-fourth aspect, the depth feeling correction unit controls, based on the one-dimensional signal, intensity of the first correction process and intensity of the second correction process.

Accordingly, it is possible to control, in accordance with the one-dimensional signal, in conjunction with each other, the intensity of the first correction process and the intensity of the second correction process.

According to a twenty-seventh aspect of the invention, an image processing system comprises an image processor and a controller. The image processor includes an image data input unit, a depth data input unit, and a depth feeling correction unit. The image data input unit receives an image data signal that can form an image constituted by pixels. The depth data input unit receives the depth data that corresponds to the image data signal. The depth degree input unit receives a one-dimensional signal that is used to control depth feeling in the image formed by the image data signal. The depth feeling correction unit is configured for performing an edge enhancement process on the image data signal in a near view area on the image if value of the one-dimensional signal is equal to or smaller than a predetermined value, and performing an edge enhancement process on the image data signal in a near view area on the image and a blur correction process on the image data signal in the distant view area on the image if value of the one-dimensional signal is larger than the predetermined value. The controller includes an operation unit with which a user can input the one-dimensional signal to the depth degree input unit of the image processor by performing a one-dimensional operation.

Accordingly, in the image processing system, the single operation of the operation unit of the controller allows the user to select the edge enhancement process and blur correction process in the image processor, and to adjust the process intensities of the edge enhancement process and blur correction process in the image processor.

According to a twenty-eighth aspect of the invention, an image processing method comprises image data inputting step, a depth data inputting step, a depth degree inputting step, and a depth feeling correction step. In the image data inputting step, an image data signal is input that can form an image constituted by pixels. In the depth data inputting step, depth data is input that corresponds to the image data signal. In the depth data inputting step, a one-dimensional signal is input to control depth feeling in an image formed by the image data signal. In the depth feeling correction step, depth feeling correction is performed on the image data signal based on the one-dimensional signal.

Accordingly, it is possible to realize image processing methods that have the similar effects of the first aspect of the invention.

According to a twenty-ninth aspect of the invention, a program causes a computer to function as an image data input unit, a depth data input unit, a depth degree input unit, and a depth feeling correction unit. The image data input unit receives an image data signal that can form an image constituted by pixels. The depth data input unit receives depth data that corresponds to the image data signal. The depth degree input unit receives a one-dimensional signal that is used to control depth feeling in the image formed by the image data signal. The depth feeling correction unit performs depth feeling correction on the image data signal based on the one-dimensional signal.

Accordingly, it is possible to realize programs that have the similar effects of the first aspect of the invention.

According to a thirtieth aspect of the invention, a computer-readable record medium stores a program which causes a computer to function as an image data input unit, a depth data input unit, a depth degree input unit, and a depth feeling correction unit. The image data input unit receives an image data signal that can form an image constituted by pixels. The depth data input unit receives the depth data that corresponds to the image data signal. The depth degree input unit receives a one-dimensional signal that is used to control depth feeling in the image formed by the image data signal. The depth feeling correction unit performs a depth feeling correction on the image data signal based on the one-dimensional signal.

Accordingly, it is possible to realize computer-readable record media recording programs having the similar effects of the first aspect of the invention.

According to a thirty-first aspect of the present invention, an integrated circuit comprises an image data input unit, a depth data input unit, a depth degree input unit, and a depth feeling correction unit. The image data input unit receives an image data signal that can form an image constituted by pixels. The depth data input unit receives depth data that corresponds to the image data signal. The depth degree input unit receives a one-dimensional signal that is used to control depth feeling in the image formed by the image data signal. The depth feeling correction unit performs depth feeling correction on the image data signal based on the one-dimensional signal.

Accordingly, it is possible to realize integrated circuits that have similar effects of the first aspect of the invention.

According to the image processors, the image processing methods, the programs, the storage media and the integrated circuits of the present invention, when adjusting the depth feeling as an image quality adjustment, the degree of depth feeling can be adjusted by the operation of the one-dimensional parameter.

Furthermore, according to the image processors, the image processing methods, the program, the storage media and the integrated circuits of the present invention, since the user sets the parameter from the input unit, it is easy to adjust the degree of depth feeling by his or her single operation to his or her taste.

DETAILED DESCRIPTION OF THE INVENTION

A description will be made on an embodiment of the present invention with reference to drawings, hereinafter.

First Embodiment

<1: Structure of the Image Processor>

Figure 1:
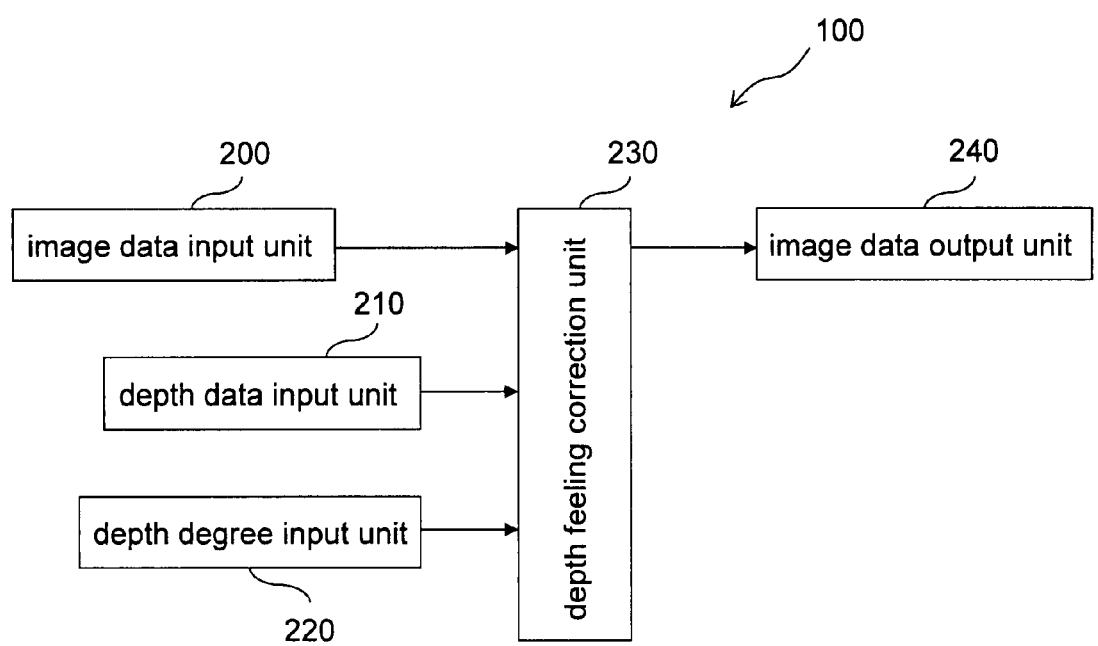
FIG. 1 is a block diagram of an image processor according to the first embodiment of the present invention.
Figure 2:
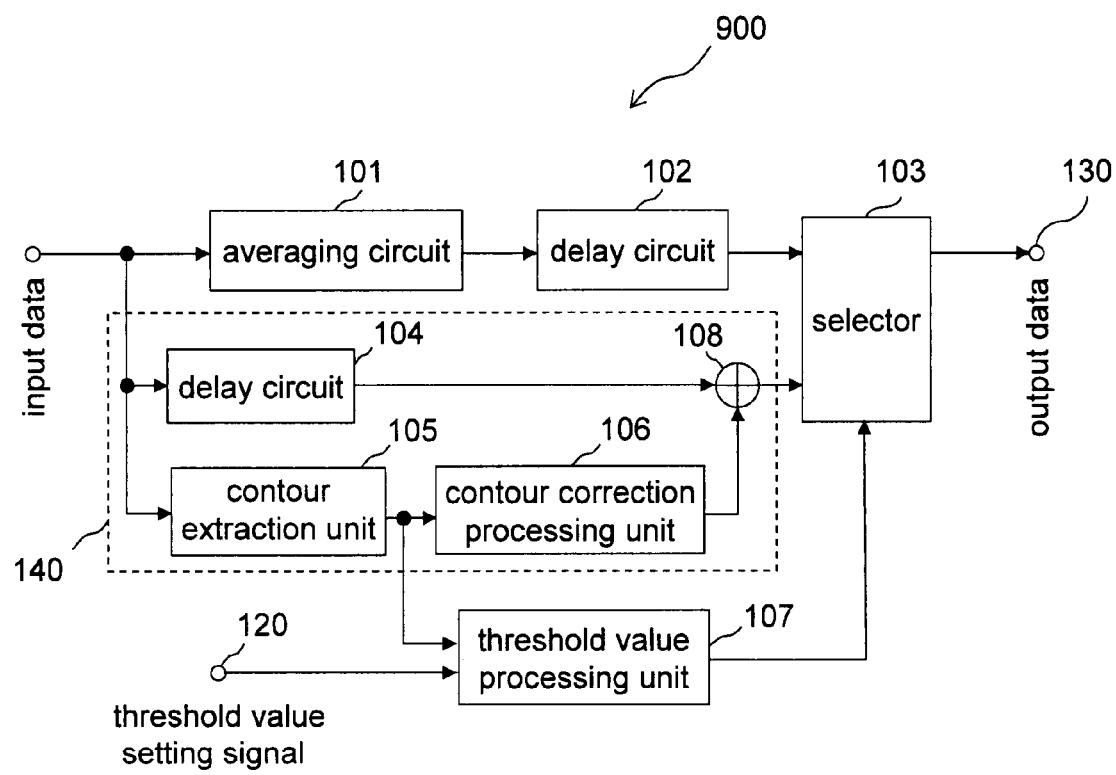
FIG. 2 is a block diagram of the conventional depth feeling enhancement device.

FIG. 1 shows a block diagram of an image processor 100 according to the first embodiment of the present invention.

The image processor 100 according to the present embodiment mainly includes an image data input unit 200 to which an image (image signal (image data)) on which a depth feeling enhancement process is performed is input, a depth data input unit 210 to which depth data is input that corresponds to image signal (input image signal) input to the image processor 100, a depth degree input unit 220 to which a user inputs his favorite depth degree, a depth feeling correction unit 230 that performs a depth feeling correction on the input image signal based on depth data input from the depth data input unit 210 and depth degree input from the depth degree input unit 220, and an image data output unit 240 that changes the image signal corrected by the depth feeling correction unit 230 to a predetermined format for output.

The image data input unit 200 receives the image (image signal (image data)) on which the depth feeling enhancement process is performed, and outputs the input image signal (input image signal) to the depth feeling correction unit 230.

The depth data input unit 210 receives the depth data corresponding to the image data signal, and outputs the input depth data to the depth feeling correction unit 230. "Depth data corresponding to the image data signal" means depth data concerning pixels constituting the two-dimensional image formed by the image data signal (or an area consisting of a plurality of pixels (blocks)), and, for example, corresponds to depth data correlated to pixel position (i, j) which is a pixel's position on the two-dimensional image. "Depth data" is value to be set for each of pixels or blocks divided from the image, and is, for example, in a case of a two-dimensional image obtained by photographing an actual three-dimensional space by a camera, degree of the distance between a position in the actual three-dimensional space corresponding to pixels on the two-dimensional image (or blocks) and a position of the camera in the three-dimensional space when the two-dimensional image is obtained.

For example, if the depth data is set to be integral values from "0" to "7" and the distance between a position of the pixel on the two-dimensional image A in the three-dimensional space (pixel position (i1, j1)) and a position of the camera in a three-dimensional space is smaller than predetermined value L1 (i.e., it is a near view), the depth data of the pixel A (pixel position (i1, j1)) is set to be "0" (a value indicating a near view). If the distance between a position of the pixel on the two-dimensional image B in the three-dimensional space (pixel position (i2, j2)) and a position of the camera in a three-dimensional space is larger than predetermined value L2 (i.e., it is a distant view), the depth data of the pixel B (pixel position (i2, j2)) is set to be "7" (a value indicating a distant view). As described above, the depth data can be decided for each of pixels (or each of areas).

Alternatively, value of the depth data can be, for example, data that is obtained in advance by a range finder (a range finder worked with shooting lens) and so on. Furthermore, the value of the depth data can be obtained by stereo measurement with a plurality of images (a method by stereo matching).

The depth degree input unit 220 receives the depth degree desired by users (depth degree data), and outputs the input depth degree to the depth feeling correction unit 230.

The depth feeling correction unit 230 performs depth feeling correction on the input image signal, based on the depth data input from the input unit 210 and the depth degree input from the depth degree input unit 220.

Figure 3:
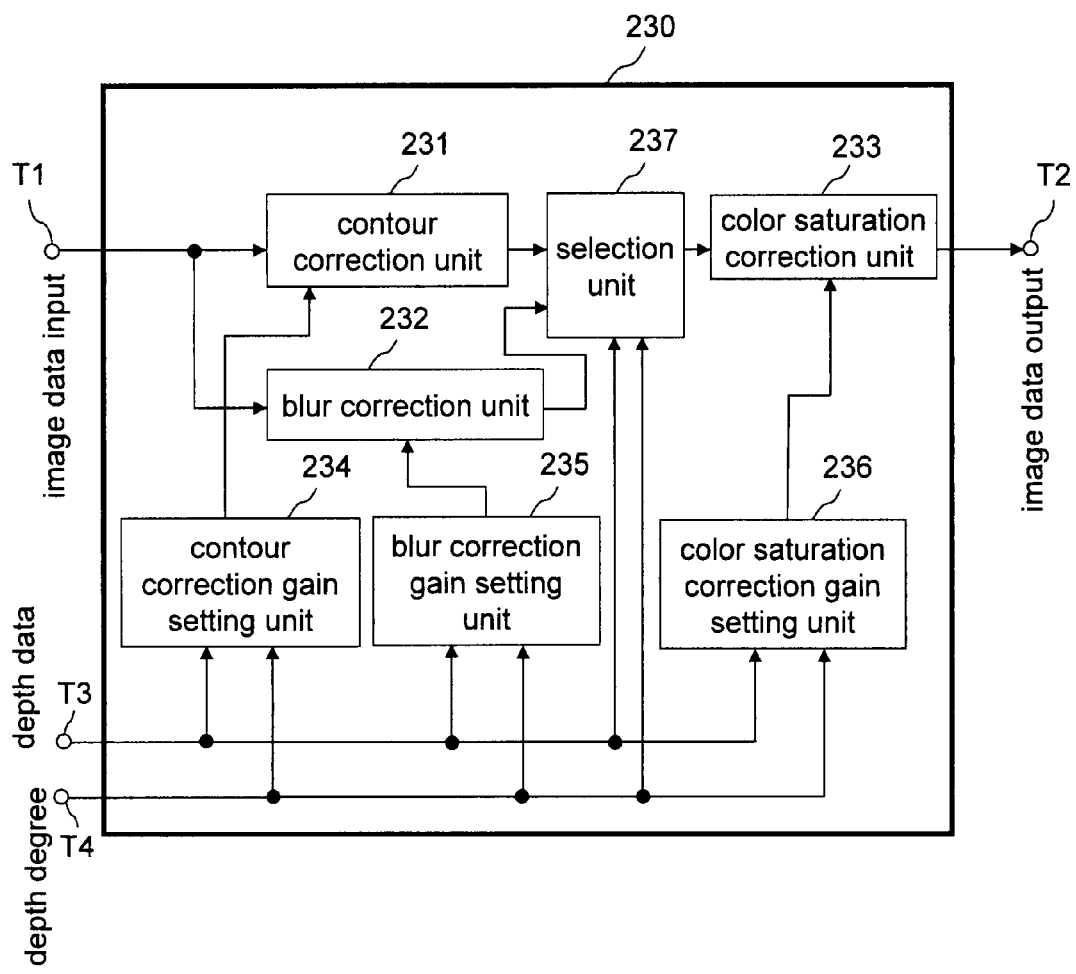
FIG. 3 is a block diagram of the depth feeling correction unit.

The depth feeling correction unit 230 includes, as shown in FIG. 3, a contour correction unit 231 that performs contour correction on the input image signal, a blur correction unit 232 that performs blur correction on the input image signal, a selection unit 237 that selects, based on the depth data output from the depth data input unit 210 and the depth degree output from the depth degree input unit 220, one of the image signal output from the contour correction unit 231 and the image signal output from blur correction unit 232, and a color saturation correction unit 233 that performs color saturation on the image signal output from the selection unit 237.

The depth feeling correction unit 230 further includes a contour correction gain setting unit 234 that sets contour correction gain based on the depth data and depth degree, a blur correction gain setting unit 235 that sets blur correction gain based on the depth data and depth degree, and a color saturation correction gain setting unit 236 that sets color saturation correction gain based on the depth data and depth degree.

The contour correction unit 231 receives the input image signal output from the image data input unit 200 and the contour correction gain output from the contour correction gain setting unit 234, and performs contour correction process on the input image signal based on the contour correction gain. The contour correction unit 231 outputs the image signal on which the contour correction process is performed to the selection unit 237.

The blur correction unit 232 receives the input image signal output from the image data input unit 200 and the blur correction gain output from the blur correction gain setting unit 235, and performs blur correction on the input image signal based on the blur correction gain. The blur correction unit 232 outputs the image signal on which the blur correction is performed to the selection unit 237.

The selection unit 237 receives the depth data output from the depth data input unit 210 and the depth degree output from the depth degree input unit 220 as well as the image signal output from contour correction unit 231 and the image signal output from the blur correction unit 232, and selects, based on the depth data and depth degree, one of the outputs from the contour correction unit 231 and the blur correction unit 232, and outputs the selected one to the color saturation correction unit 233.

The color saturation correction unit 233 receives the image signal output from the selection unit 237 and the color saturation correction gain output from the color saturation correction gain setting unit 236, and performs, based on the color saturation correction gain, color saturation correction on the image signal output from the selection unit 237, and outputs the result to the image data output unit 240.

<2: Operation of the Image Processor>

A description will be made on the operation of the image processor 100 as constructed above.

The depth feeling correction unit 230 receives three kinds of signal: the image data from the image data input unit 200 (image signal); the depth data from the depth data input unit 210; and the depth degree designated by the user from the depth degree input unit 220.

"Depth data" means values to be set for each of pixels or blocks divided from the image, and includes values of "0" to "7", for example. These values are data obtained in advance by a method with a range finder, for example. The data can be obtained by methods such as a stereo measurement using a plurality of images.

Figure 4:
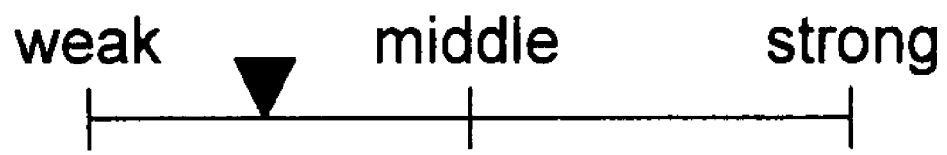
FIG. 4 is a diagram of adjustment GUI of depth degree.

"Depth degree" is one-dimensional value (one-dimensional data) decided by the operation by users, display resolution, resolution of the image data (image signal) or the like. The depth degree input unit 220 receives the one-dimensional value (depth degree) input by the user. The image processor 100 carries out adjustment of correction amount of the depth feeling the user likes by using the one-dimensional value (depth degree), for example. Typically, with a TV remote control or an adjustment control attached in a TV, the one-dimensional value (depth degree) is adjusted. In a case of the remote control, first, the user selects the image quality adjustment display, so that GUI indicated by a one-dimensional bar shown in FIG. 4 is provided, for example. When the user operates a button of the remote controller to slide an arrow of inverted triangle shown in FIG. 4 to the left to perform the adjustment of decreasing the depth feeling and to slide the arrow of inverted triangle to the right to perform the adjustment of emphasizing the depth feeling. As described above, the user operates the remote control to move the level of depth feeling to his favorite position through a single operation. Accordingly, the depth degree is input from the depth degree input unit 220.

The image data output unit 240 receives output from the depth feeling correction unit 230, and outputs the image data (image signal) whose depth feeling is corrected.

FIG. 3 is a block diagram showing the configuration of the depth feeling correction unit 230.

The depth feeling correction unit 230 receives three kinds of signal: the image data input from the image data input unit 200 (input image signal); the depth data input from the depth data input unit 210; and the depth degree input from the depth degree input unit 220. The image data (image signal) is input to the contour correction unit 231 and the blur correction unit 232.

The depth data and depth degree the user designates are input to the contour correction gain setting unit 234, the blur correction gain setting unit 235, the color saturation correction gain setting unit 236, and the selection unit 237.

Figure 5:
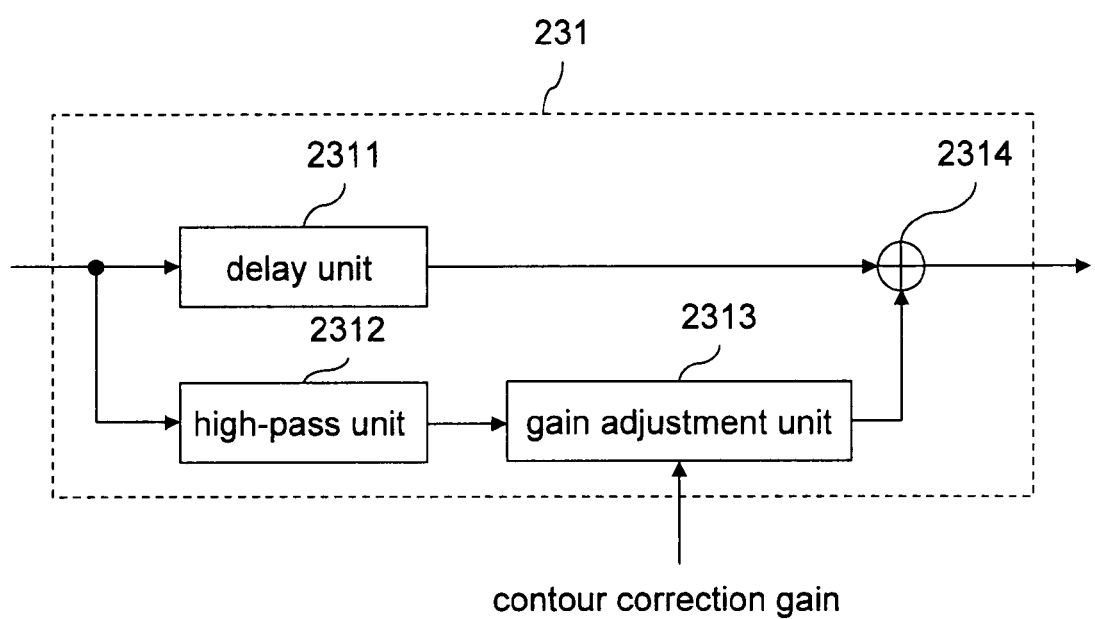
FIG. 5 is a block diagram of the contour correction unit.

FIG. 5 shows a detail of one example of the contour correction unit 231.

As shown in FIG. 5, the contour correction unit 231 mainly includes a delay unit 2311, a high-pass unit 2312, a gain adjustment unit 2313, and an addition unit 2314.

The image signal input from the image data input unit 200 is delayed by the delay unit 2311 to match times with the contour correction signal (for timing adjustment), and is output to the addition unit 2314. The image signal input from the image data input unit 200 undergoes a process (HPF (High Pass Filter) process, for example) by the high-pass unit 2312. The image signal on which the process is performed by the high-pass unit 2312 is input to the gain adjustment unit 2313, undergoes the gain adjustment by the gain adjustment unit 2313 by using the gain set by the contour correction gain setting unit 234, and is output to the addition unit 2314. The addition unit 2314 adds the image signal output from the delay unit 2311 (the image signal corresponding to the original image) with the image signal output from the gain adjustment unit 2313 (edge enhancement signal) to output the result to the selection unit 237. In other words, the image signal obtained by addition of the addition unit 2314 is output to the selection unit 237 as a signal that has undergone the contour correction for emphasizing the sharpness.

Returning to FIG. 3, the blur correction unit 232 blurs image data (image signal), i.e., performs blur correction process, using parameter (blur correction gain) σ set by the blur correction gain setting unit 235, with Gaussian function indicated by the following mathematical expression.

if σ=0 Filter(x0,y0)=1, Filter(x,y)=0    Mathematical expression 1 others $$\text{Filter}(x, y) = \frac{\exp\left(-\frac{(x-x0)^2 + (y-y0)^2}{\sigma^2}\right)}{\sum_{x=x0-n}^{x0+n} \sum_{y=y0-m}^{y0+m} \exp\left(-\frac{(x-x0)^2 + (y-y0)^2}{\sigma^2}\right)},$$

wherein (x0, y0) is a pixel position of the processing object (a pixel position on two-dimensional image formed by the image signal), and is averaged in a range within a rectangle having 2N+1 pixels in the horizontal direction and 2M+1 pixels in the vertical direction.

The image signal which has undergone the blur correction process is output to the selection unit 237.

The selection unit 237 selects, in accordance with the depth data output from the depth data input unit 210 and the depth degree output from the depth degree input unit 220, one of the outputs from the contour correction unit 231 and the blur correction unit 232 to output the selected one to the color saturation correction unit 233.

The selection unit 237 selects the output of the contour correction unit 231 before the depth degree reaches predetermined value ZT, and outputs it to the color saturation correction unit 233. If the depth degree exceeds the predetermined value ZT and value of the depth data from the depth data input unit 210 is smaller than Z2, the output of the contour correction unit 231 is selected. If the value of the depth data is larger than Z2 (a view more distant than Z2), the output of the blur correction unit 232 is selected to be output to the color saturation correction unit 233.

Figure 6:
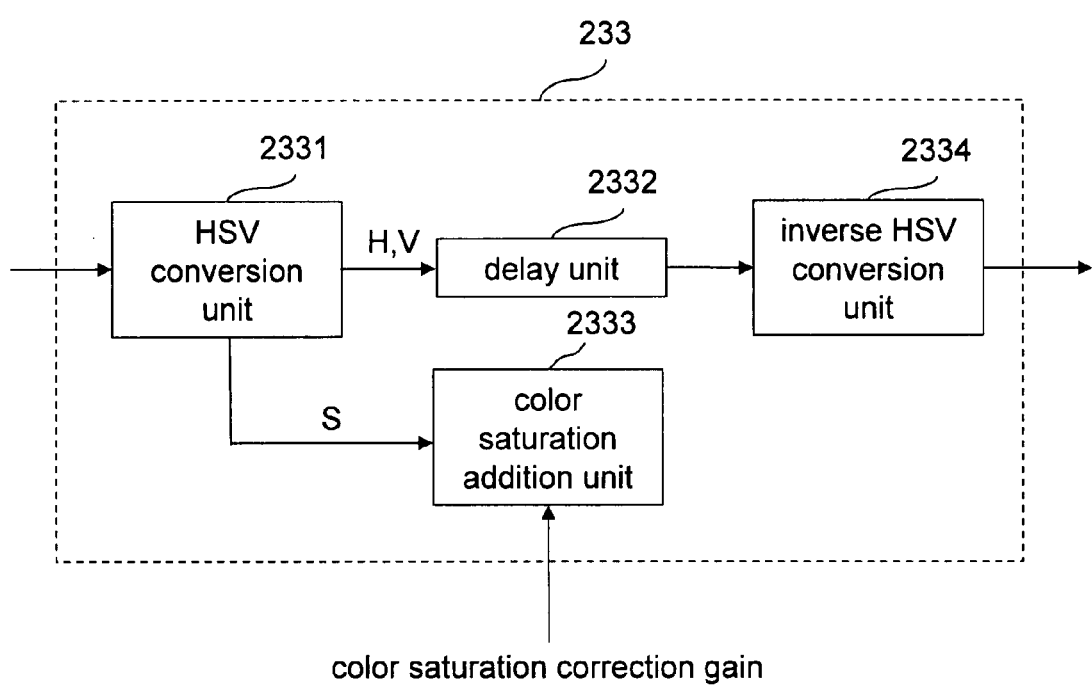
FIG. 6 is a block diagram of the color saturation correction unit.

The color saturation correction unit 233 mainly includes, as shown in FIG. 6, an HSV conversion unit 2331, a delay unit 2332, a color saturation addition unit 2333, and an inverse HSV conversion unit 2334.

Image signal output from the selection unit 237 is divided at the HSV conversion unit 2331 into H (Hue) signal, S (Saturation (color saturation)), and V (Value (brightness)) signal. The H (Hue) signal and V (Value (brightness)) signal are output through the delay unit 2332 to the inverse HSV conversion unit 2334.

The S (Saturation (color saturation)) signal divided by the HSV conversion unit 2331 is output to the color saturation addition unit 2333, is added with the color saturation, and is output to the inverse HSV conversion unit 2334.

The inverse HSV conversion unit 2334 reconstructs the H (Hue) signal and V (Value (brightness)) signal output from the delay unit 2332 and the S (Saturation (color saturation)) signal to which the color saturation is added by the color saturation addition unit 2333 into the image signal in the original format (image signal which has not been HSV-converted by the HSV conversion unit 2331 yet), i.e., the inverse HSV conversion is performed, and outputs it to the image data output unit 240. The H (Hue) signal output from the delay unit 2332 is one that has the same H (Hue) as that of the original signal (image signal output from the selection unit 237), and the V (Value (brightness)) signal output from the delay unit 2332 is one that has the same V (Value (brightness)) as that of the original signal (image signal output from the selection unit 237).

As described above, in the image processor 100, the depth feeling correction is performed as the contour correction, the blur correction and the color saturation correction.

(Method of Setting Gain)

Next, a description will be made on methods of setting the gains.

First, the contour correction gain setting unit 234 sets gain to be input to the gain adjustment unit 2313 constituting the contour correction unit 231 in accordance with the depth data and depth degree.

The contour correction gain setting unit 234, the blur correction gain setting unit 235, and the color saturation correction gain setting unit 236 set gains, for example, in accordance with a table (LUT (look-up table) to realize characteristics shown in FIG. 7.

<<Contour Correction Gain>>

First, a description will be made on the setting of contour correction gain by the contour correction gain setting unit 234.

A description will be made on depth data-contour correction gain characteristics which are used for setting the contour correction gain.

Figure 7A:
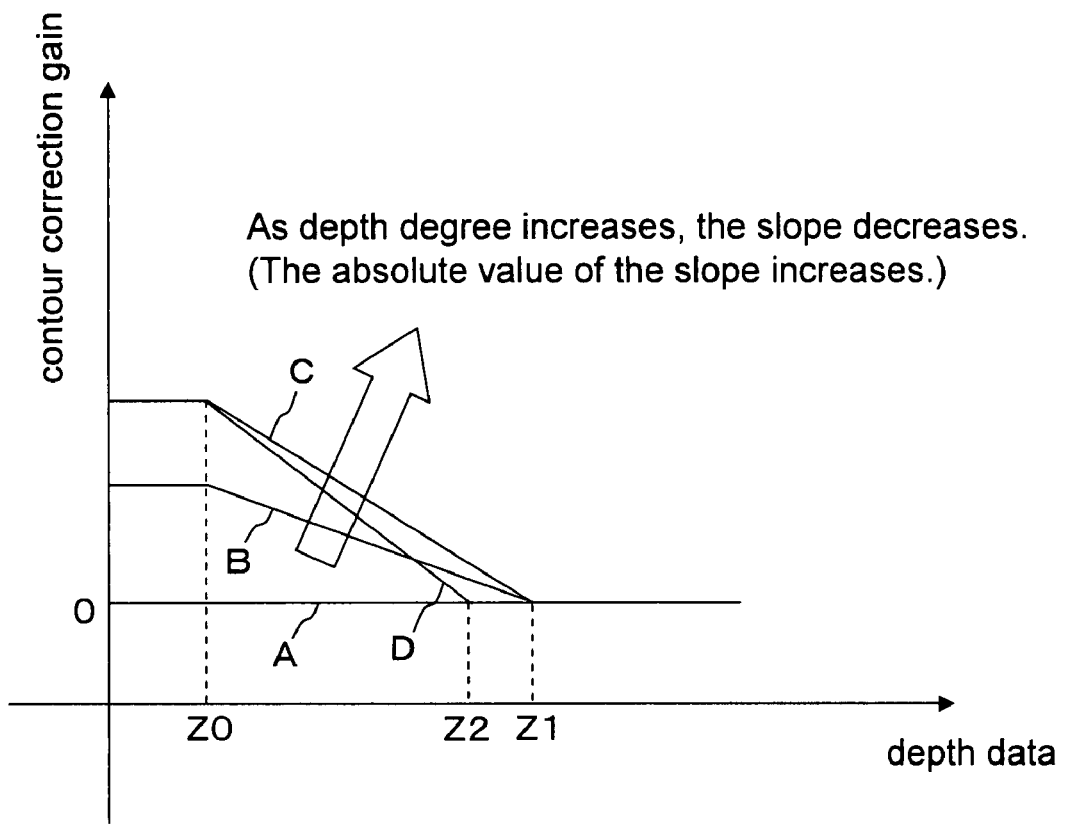
FIG. 7A is a graph showing the relationship between the depth data and the contour correction gain.

In a graph shown in FIG. 7A, the horizontal axis represents value of the depth data, and the vertical axis represents the contour correction gain.

If the input from the depth degree input unit 220 is "0", as characteristics shown in graph A in FIG. 7, the gain is "0" on all of the depth data.

The depth data-contour correction gain characteristics are a graph (characteristics) in which if the input from the depth degree input unit 220 exceeds "0", for example, as characteristics shown in graph B in FIG. 7, the depth data shows a slope from Z0 to Z1 (Although the slope is not "0", only the slope "0" of the straight line shown in graph A is included.).

In the depth data-contour correction gain characteristics, if the depth degree further increases, the slope of the straight line (or a curve) showing the depth data-contour correction gain characteristics gradually decreases; and if the depth degree reaches predetermined value ZT, the characteristics are realized that show the graph C. Even if the depth degree is further increased, the slope of the straight line does not decrease until the depth degree exceeds the predetermined value ZT.

In the depth data-contour correction gain characteristics, if the depth degree exceeds the predetermined value ZT, the gain has no change when the depth data is Z0, and the depth data whose contour correction gain is "0" is moved from Z1 toward Z2 (in the negative direction in the X axis in FIG. 7A) (changing to characteristics in graph D).

Figure 7B:
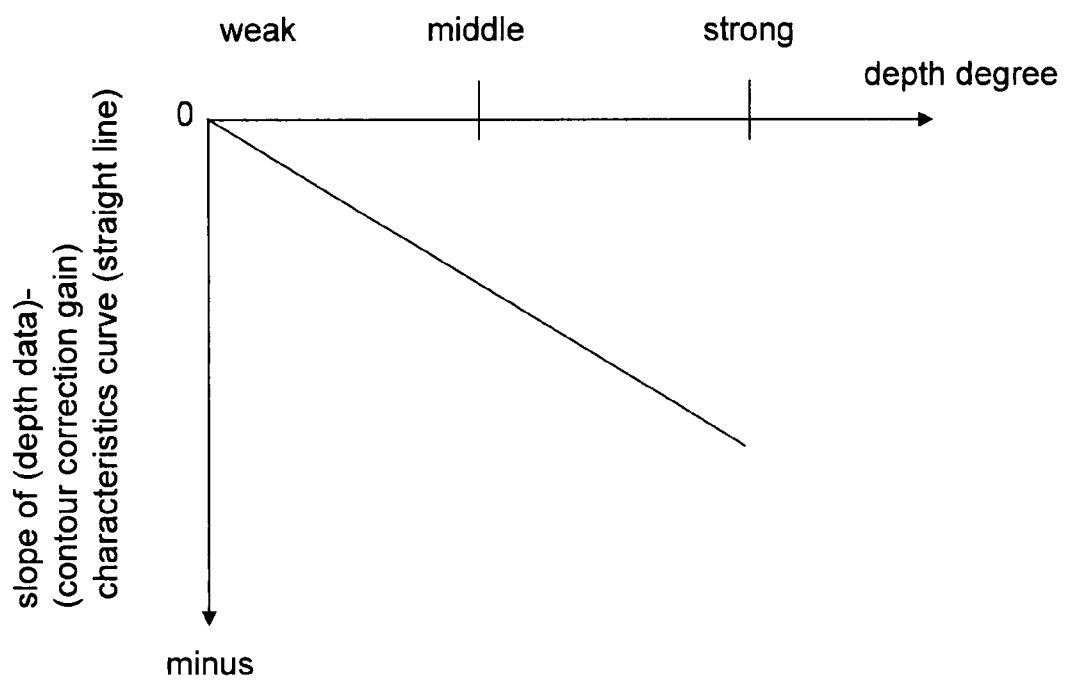
FIG. 7B is a graph showing the relationship between the depth degree and the slope of the depth data-contour correction gain characteristics curve (straight line).

FIG. 7B is a view of the characteristics shown in FIG. 7A seen from a different point of view, and is a graph having the horizontal axis that represents depth degree and the vertical axis that represents the slope (variation of the contour correction gain relative to the depth data (derivative)) of the straight line (curve) indicating the depth data-contour correction gain characteristics. The vertical axis shown in FIG. 7B is the slope of the straight line (curve) indicating depth data-contour correction gain characteristics where the slope of the straight line (curve) is not "0" (it includes only the slope "0" of the straight line shown in graph A of FIG. 7A).

As shown in FIG. 7B, as the depth degree increases, the slope of the contour correction gain monotonically decreases.

As described above, the contour correction gain is set such that as the depth degree as the one-dimensional data is changed, the difference in degree of edge enhancement between the farthest area and the nearest area increases.

<<Blur Correction Gain>>

Figure 8A:
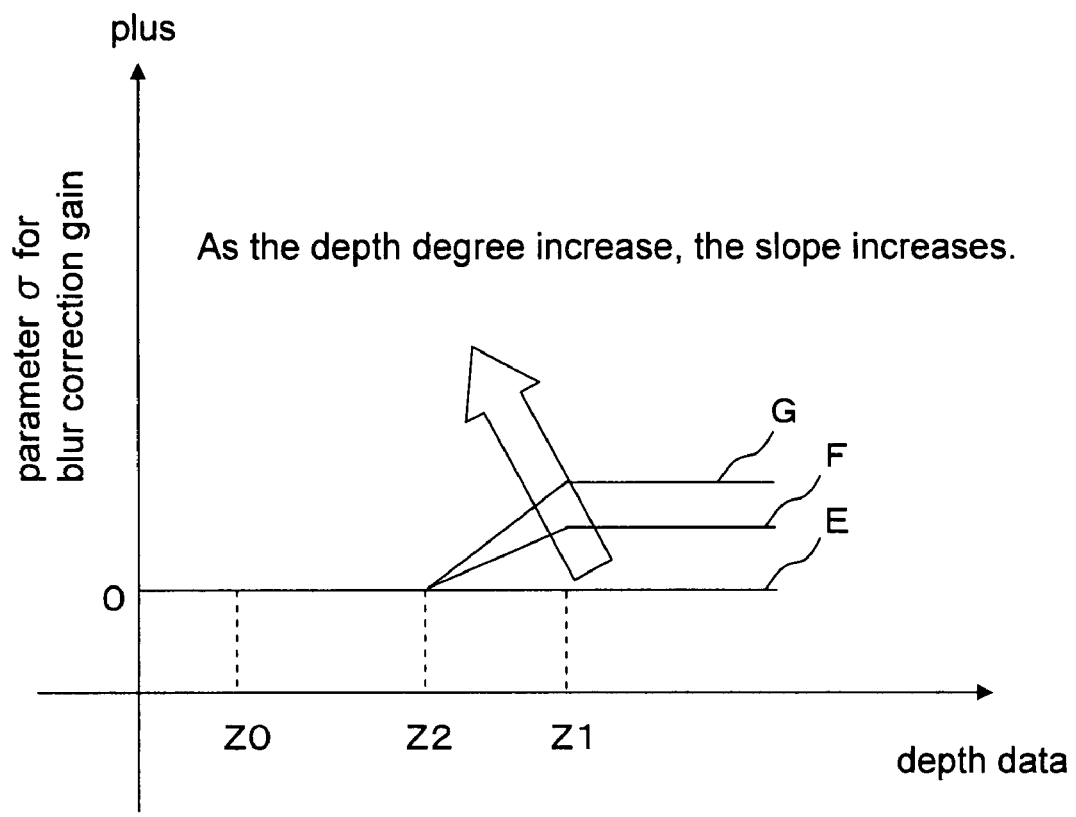
FIG. 8A is a graph showing the relationship between the depth data and the parameter for blur correction gain.

Next, the blur correction gain setting unit 235 obtains, referring to a table that realizes characteristics shown in FIG. 8A, a parameter for blur correction gain, and outputs the obtained parameter for blur correction gain to the blur correction unit 232. The blur correction unit 232 performs blur correction process by blur correction gain decided by the parameter for blur correction. A process by the blur correction unit 232 is one corresponding to mathematical expression 1.

In a graph shown in FIG. 8, the horizontal axis represents the depth data, and the vertical axis represents value of the parameter σ for correction gain used in mathematical expression 1.

The depth data-parameter for blur correction gain is characteristics of graph E until the depth degree reaches the predetermined value ZT, and value of the parameter σ for blur correction gain is "0" for all of the depth data. Accordingly, in this case, the value "0" of the parameter σ for blur correction gain is output to the blur correction unit 232, and the blur correction unit 232 does nothing as shown in mathematical expression 1 when receiving the input "σ=0" and outputs the input image data (image signal) as it is.

After the depth degree input from the depth degree input unit 220 reaches the predetermined value ZT, as the depth degree exceeds the predetermined value ZT, the depth data-parameter for blur correction gain is changed from characteristics shown in graph E in FIG. 8A to characteristics shown in graph F, and to characteristics shown in graph G. For example, if the depth data-parameter for blur correction gain is decided in accordance with the characteristics shown in graph F in FIG. 8, value of the finite parameter σ for blur correction gain, which is decided by the graph F, is output to the blur correction unit 232.

Then, in proportion to the depth degree, the slope of the straight line showing the depth data-parameter for blur correction gain increases, so that the slope of the straight line in the characteristics shown in graph G finally reaches the upper limit. The value Z2 of the depth data is the same as Z2 of the contour correction gain setting unit 234 in a graph of FIG. 7.

Figure 8B:
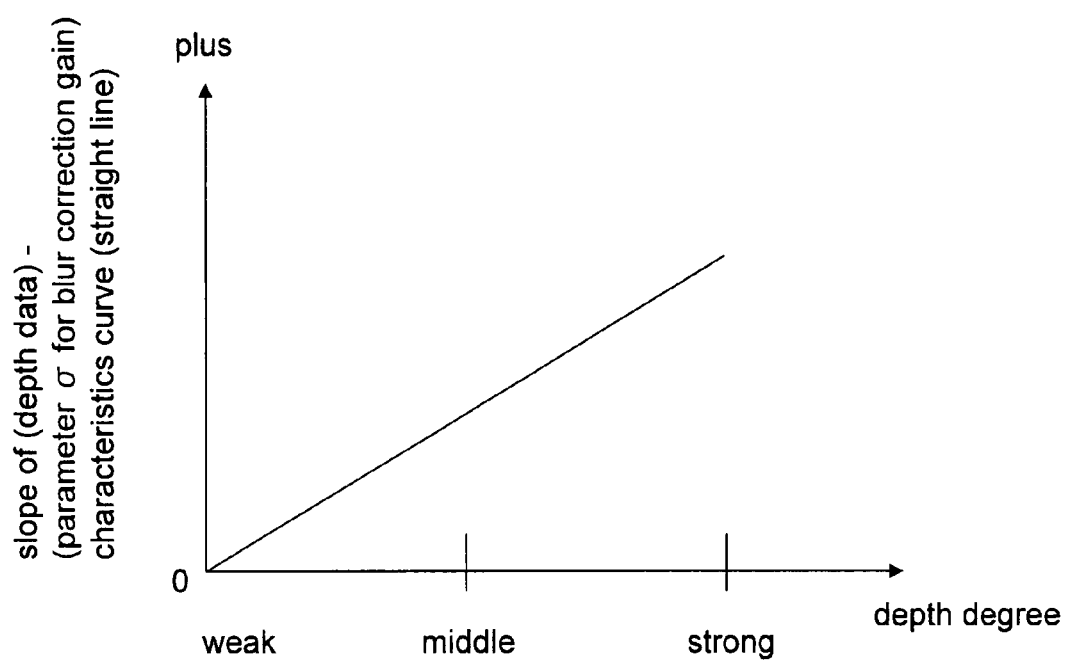
FIG. 8B is a graph showing the relationship between the depth degree and the slope of the depth data-parameter for blur correction gain curve (straight line).

FIG. 8B is a view of the characteristics in FIG. 8B seen from a different point of view, and is a graph having the horizontal axis that represents the depth degree and the vertical axis that represents the slope of the straight line indicating the depth data-parameter for blur correction gain (variation of the parameter σ for contour correction gain to the depth data (derivative)).

As shown in FIG. 8B, as the depth degree increases, the slope of the straight line indicating the depth data-parameter for blur correction gain monotonically increases.

As described above, the parameter σ for contour correction gain is set such that as the depth degree as the one-dimensional data changes, in the two-dimensional image formed by the image signal, the difference increases between the degree of blur enhancement in the farthest view area and the degree of blur enhancement in the nearest view area. In other words, the blur correction gain setting unit 235 sets the parameter for contour correction gain based on the above-described depth data-parameter for blur correction gain.

<<Color Saturation Correction Gain>>

Next, a description will be made on the setting of the color saturation correction gain by the color saturation correction gain setting unit 236.

A description will be made on depth data-color saturation correction gain characteristics used for setting the color saturation correction gain.

Figure 9A:
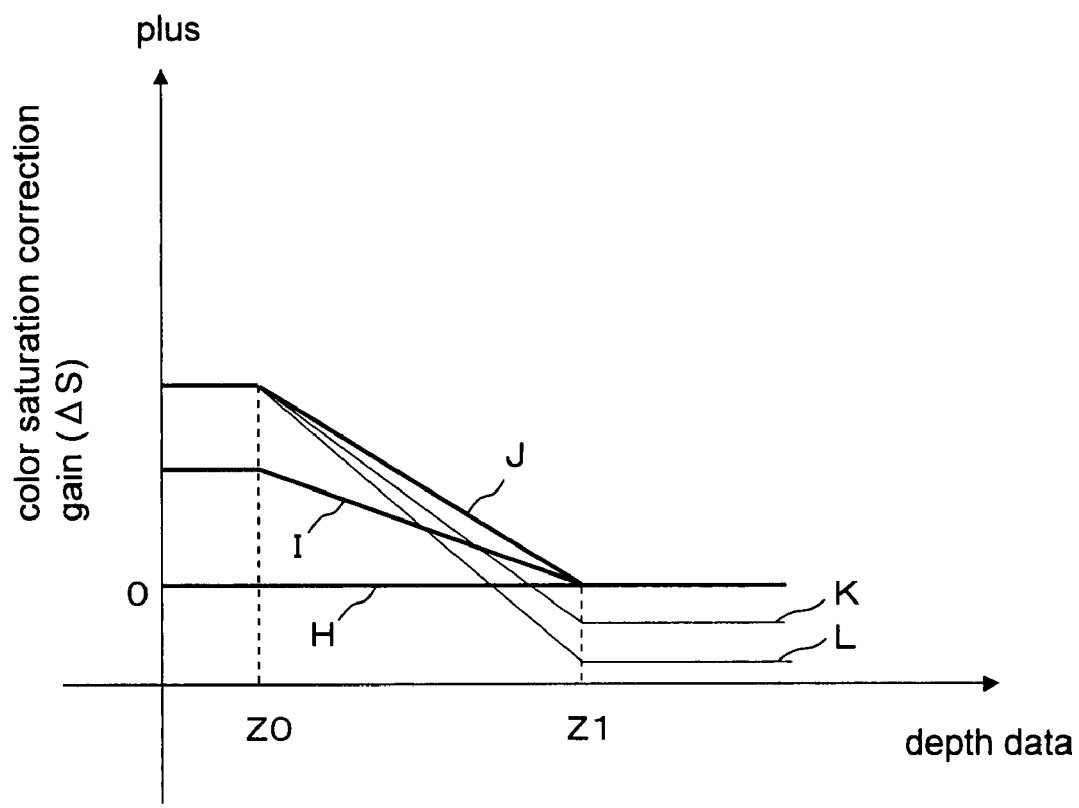
FIG. 9A is a graph showing the relationship between the depth data and the color saturation correction gain.

The color saturation correction gain setting unit 236 obtains the color saturation gain with reference to a table to realize the characteristics shown in FIG. 9A, and outputs the obtained color saturation gain to the color saturation correction unit 233.

In a graph shown in FIG. 9A, the horizontal axis represents depth, and the vertical axis represents increase of color saturation.

In FIG. 9A, if the depth degree is "0", not depending on the value Z of the depth data, ΔS is "0" (characteristics shown in graph H). As the depth degree increases, as the characteristics shown in graph I FIG. 9A, the slope of the depth data-color saturation correction gain characteristics straight line (curve) when the depth data increases from Z0 to Z1 increases, and if the depth degree reaches the predetermined value ZT, the depth data-color saturation correction gain characteristics become characteristics shown in graph J. Then, if the depth degree exceeds the predetermined value ZT, the color saturation correction gain having negative addition gain like the characteristics shown in graph K in FIG. 9A is obtained by the color saturation correction gain setting unit 236, and is output to the color saturation correction unit 233. If the depth degree further increases, as the characteristics shown in graph L, the color saturation correction gain having larger negative addition gain is obtained by the color saturation correction gain setting unit 236 (obtained by the LUT, for example), and is output to the color saturation correction unit 233.

Figure 9B:
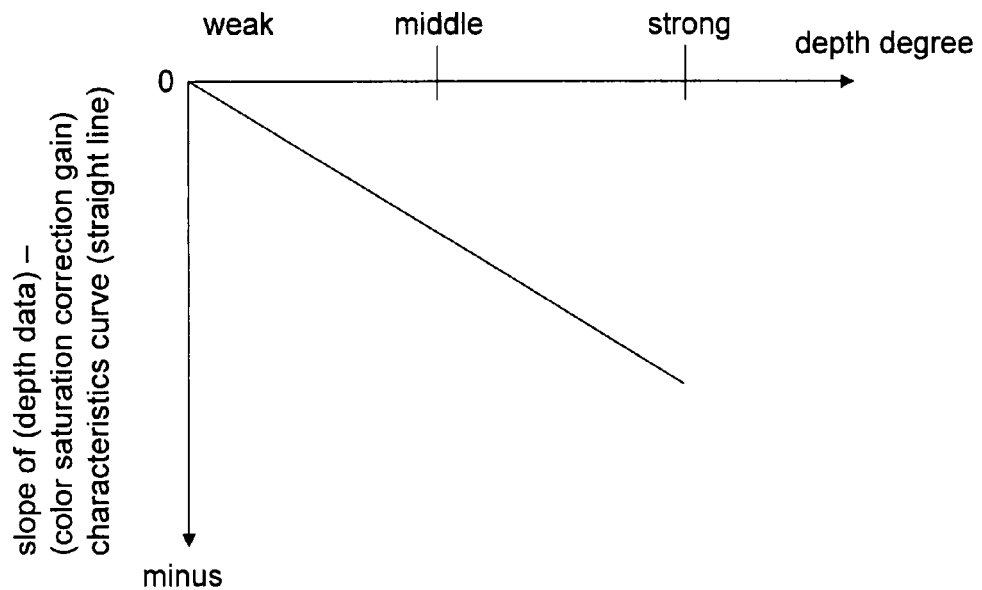
FIG. 9B is a graph showing the relationship between the depth degree and the slope of the depth data-color saturation correction gain characteristics curve (straight line)

FIG. 9B is a view of the characteristics shown in FIG. 9B seen from a different point of view, and is a graph having the horizontal axis representing depth degree and the vertical axis representing the slop of the straight line (it can be a curve.) indicating the depth data-color saturation correction gain characteristics when the straight line depth data is in the range between Z0 to Z1.

Figure 9C:
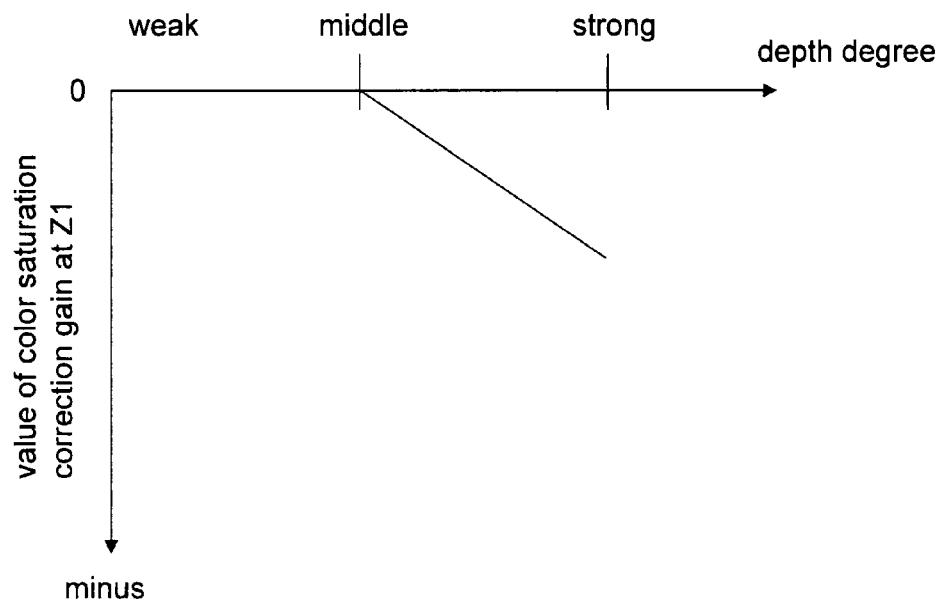
FIG. 9C is a graph of showing the relationship between the depth degree and value of the color saturation correction gain at Z1.

FIG. 9C is a view of the characteristics shown in FIG. 9A seen from a different point of view, and is a graph having the horizontal axis representing depth degree and the vertical axis representing the value of color saturation correction gain when the depth data is Z1.

As shown in FIG. 9B, as the depth degree increases, the slope of the straight line (curve) indicating the depth data-color saturation correction gain characteristics monotonically decreases. In FIG. 9C, the value of color saturation correction gain when the depth data is Z1 is zero in the area where the depth degree is in the range between "weak" and "middle". The color saturation correction gain is corrected as all of the positive values (The color saturation correction gain shows positive value if the depth data is smaller than Z1, and the color saturation correction gain shows "0" if the depth data is equal to or larger than Z1.). In the area where the depth degree is in the range between "middle" to "strong", as the depth degree increases, the color saturation correction gain monotonically decreases in the negative area. In other words, as the depth degree increases, absolute value of the color saturation correction gain increases while keeping the negative value.

As described above, in the image processor 100, as depth degree as the one-dimensional data changes, both the color saturation enhancement process and color saturation suppression process are performed in an image of one frame.

In the setting of the gain as described above, in the image processor 100, until the depth degree reaches the predetermined value ZT, the nearer the depth is (the smaller the value of the depth data is), the stronger the degrees of effects of the contour correction and color saturation correction are.

Then, in the image processor 100, if the depth degree exceeds the predetermined value ZT, a near area in the image (near view area) is not changed at all, but blur process and color saturation decreasing process are performed on a distant area (distant view area). Accordingly, in the image processor 100, by enlarging the difference in the degree of edge enhancement and color saturation between the near view area and distant view area, the depth degree in the processing image is increased, so that depth feeling adjustment can be performed according to user's personal point of view.

As described above, in the image processor 100, the increase of the depth degree up to the predetermined value causes only the depth feeling to increase without deteriorating the image quality, and the setting of the depth data to exceed the predetermined value causes the depth feeling to increase further. The image quality of the processing image is deteriorated, though. In other words, in the image processor 100, by a simple operation in accordance with user's personal point of view, it is possible to increase or decrease the degree of depth of the processing image.

In the image processor 100 according to the present embodiment, although the depth feeling correction is performed as the contour correction, the blur correction, and the color saturation correction, it is not necessary to use all of the corrections. For example, in the image processor 100, only the contour correction process and the color saturation enhancement process of the color saturation correction process may be performed on the input image signal, and the blur correction process and the color saturation suppression process of the color saturation correction may not be performed on the input image signal.

Figure 11:
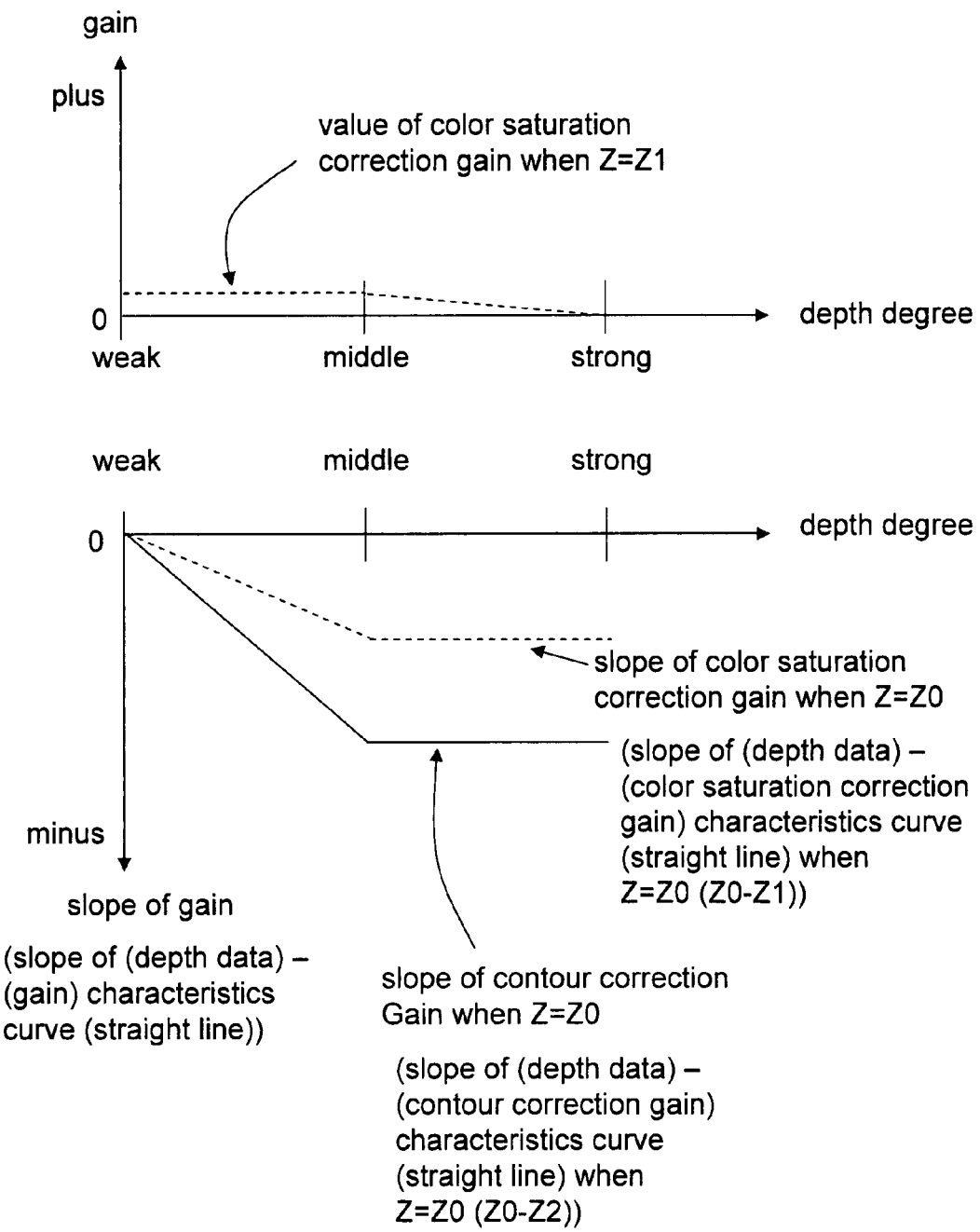
FIG. 11 is a view of relationship between the depth degree, the gain for the color saturation correction, and the gain for the contour correction.

FIG. 11 shows one example of the above-described case. In this case, in the image processor 100, until the depth degree reaches "middle" indicating the predetermined value, the slope of the gain characteristics straight line (curve) for the depth data-edge enhancement correction in the range where the depth data Z=Z0 shown in FIG. 7A (the slope of the characteristics straight line in the range where the depth data Z is from Z0 to Z2) monotonically decreases, and the slope of the gain characteristics straight line (curve) for the depth data-edge enhancement correction is kept constant in the range where the depth degree is from "middle" to "strong", so that only the edge enhancement is performed on the input image signal according to the depth data Z.

Furthermore, in the image processor 100, the slope of the gain characteristics straight line (curve) for depth data-color saturation correction shown in FIG. 9A in the range where the depth data Z=Z0 (the slope of characteristics straight line in the range where the depth data Z is from Z0 to Z1) monotonically decreases from "0" as the depth degree increases from "weak" to "the "middle". If the depth degree is larger than "middle", the slope of the gain characteristics straight line (curve) for the depth data-color saturation correction is set to be the predetermined constant value.

Then, in the image processor 100, it is controlled such that the color saturation correction gain when the depth data Z=Z1 shown in FIG. 9A is set to be "0" if the depth degree is in the range between the "weak" and "middle", and monotonically decreases from "0" to the negative value as the depth degree increases from "middle". Accordingly, in a case that the depth degree is strong, in the distant view area where depth data Z=Z1, the color saturation correction gain becomes the negative value, and the color saturation suppression process is performed to realize the distant view feel. Alternatively, it is controlled such that the color saturation correction gain when the depth data Z=Z1 in FIG. 9A can be a predetermined positive value, and, as the depth degree increases from "middle", can monotonically decrease from the predetermined positive value to "0". In this case, if the depth degree is strong, the color saturation correction process is not performed in the distant view area where the depth data Z=Z1. In other words, in this case, only the color saturation correction process is performed on an area where the depth data is smaller than Z1 (Even if it is an area whose value of the depth data is larger than Z1, the color saturation suppression process is not performed.).

As described above, in the image processor 100, the two different enhancement processes are performed to apply depth feeling effect (effects to enhance the depth feeling) to the image, and it is possible to control the two different enhancement correction processes simultaneously only with the depth degree value input by the user.

Figure 10:
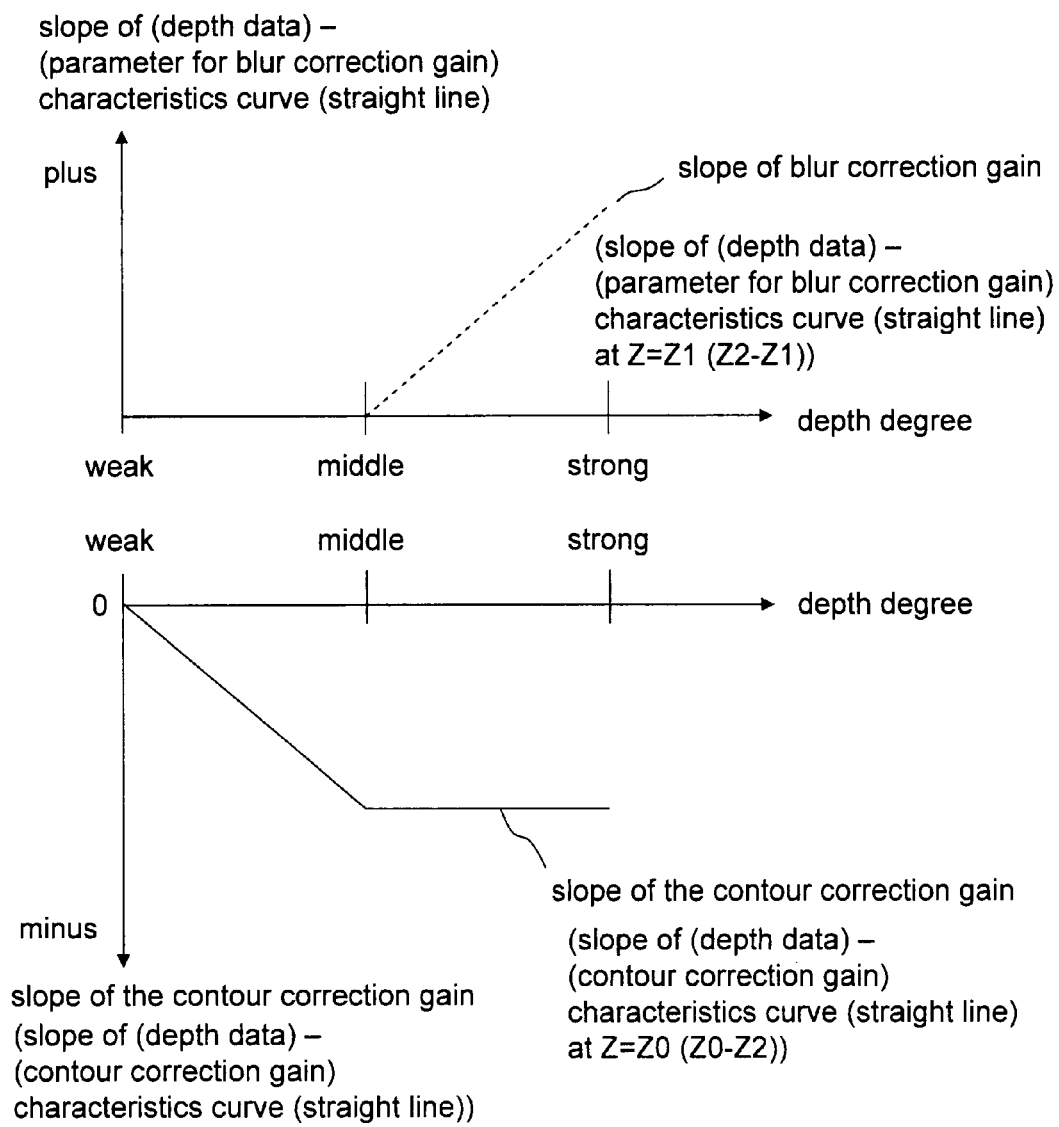
FIG. 10 is a view of the relationship between the depth degree, the contour correction gain, and the blur correction gain.

However, in the image processor 100, it is preferable in terms of the depth feeling effect that in a case that the above-described depth feeling correction is performed by the contour correction, the blur correction and the color saturation correction, as shown in FIG. 9 and FIG. 10, as the depth degree increases, until the depth degree reaches the predetermined value (the value corresponding to the depth degree "middle"), both the contour correction and color saturation enhancement process are performed; and if the depth degree exceeds the predetermined value, the blur correction and the color saturation suppression processes are further performed.

The reason is that it is possible to further increase the depth feeling for the user by doing this.

In the image processor 100 according to the present embodiment, although the contour correction and color saturation correction are employed as the image quality correction, the present invention is not limited to this example. Any process can be employed that can increase the depth feeling by applying different gains to the near view area and distant view area in the image.

(Modification 1)

Next, a description will be made on modification 1 of the image processor 100 according to the present embodiment.

The modification 1 is characterized as performing the contrast correction process on the image signal. Other structures will not be described because they are similar to those in the above-described embodiment.

Figure 13:
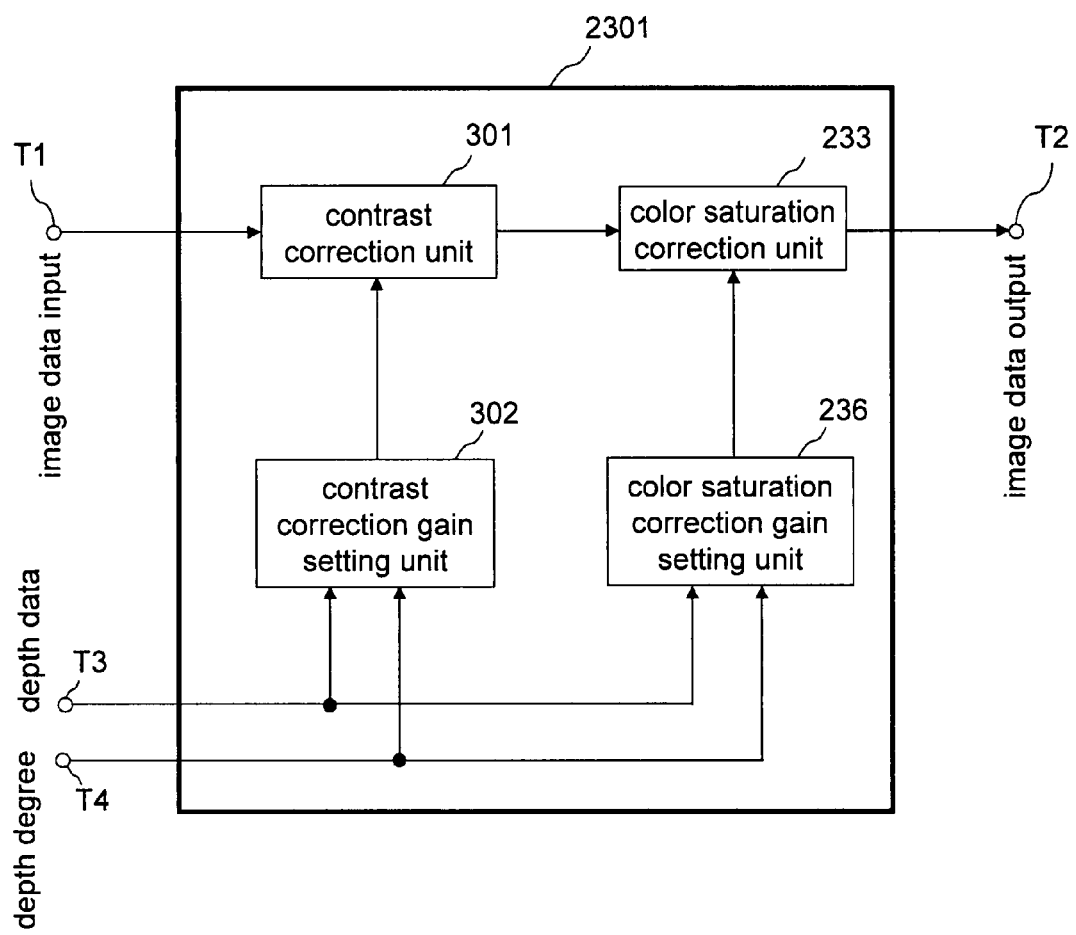
FIG. 13 is a block diagram of the depth feeling correction unit according to the modification 1 of the first embodiment.

The image processor according to the modification 1 can be realized by replacing the depth feeling correction unit 230 in the image processor 100 of the first embodiment into a depth feeling correction unit 2301 shown in FIG. 13.

Figure 14:
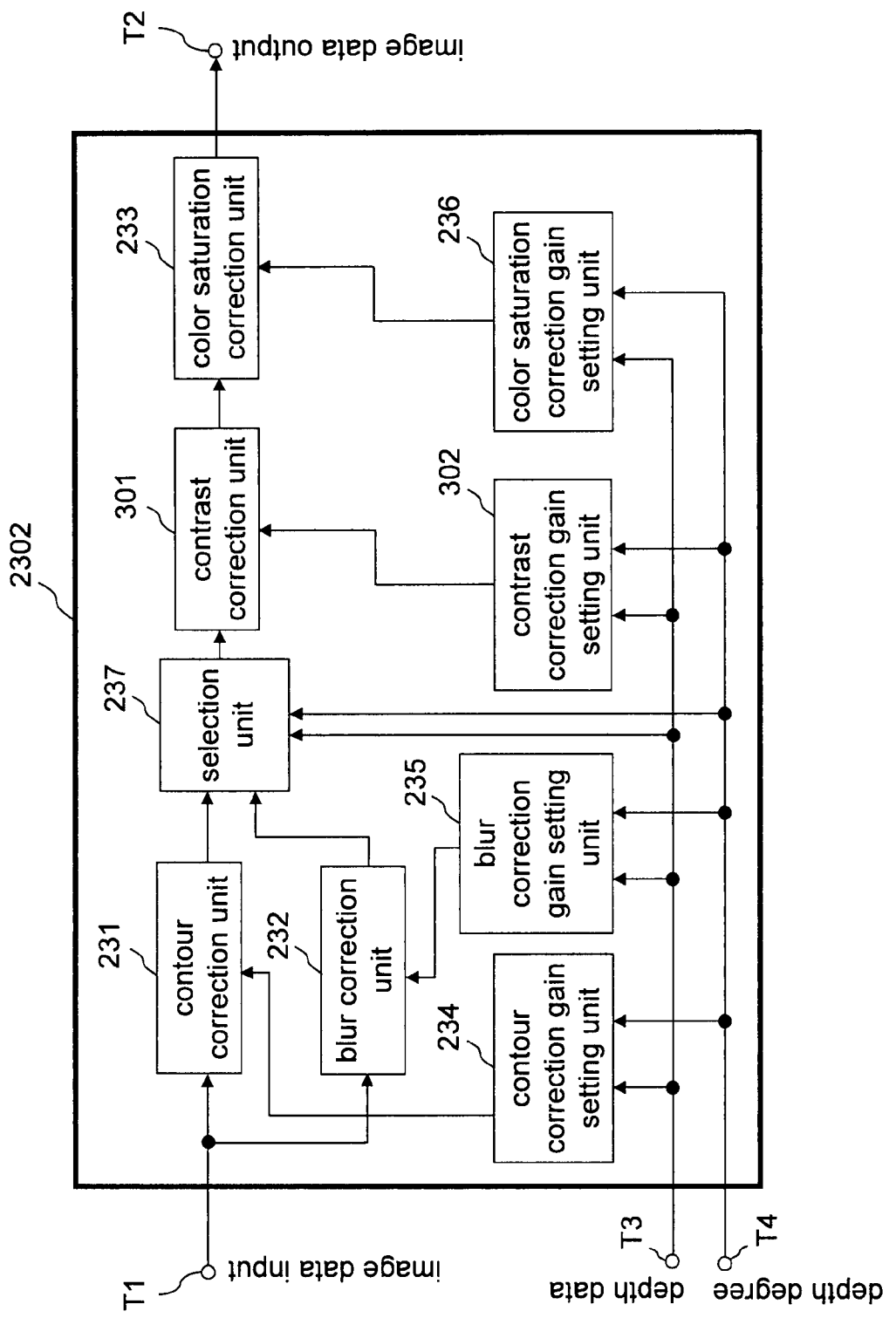
FIG. 14 is a block diagram of the depth feeling correction unit according to the modification 1 of the first embodiment.

Alternatively, the image processor according to the modification 1 can be realized by replacing the depth feeling correction unit 230 in the image processor 100 of the first embodiment into a depth feeling correction unit 2302 shown in FIG. 14.

Alternatively, the image processor according to the modification 1 can be realized by replacing the contour correction unit 231 of the depth feeling correction unit 230 into a contrast correction unit 301, and the contour correction gain setting unit 234 into the contrast correction gain setting unit 302, in the first embodiment of the image processor 100.

Figure 12:
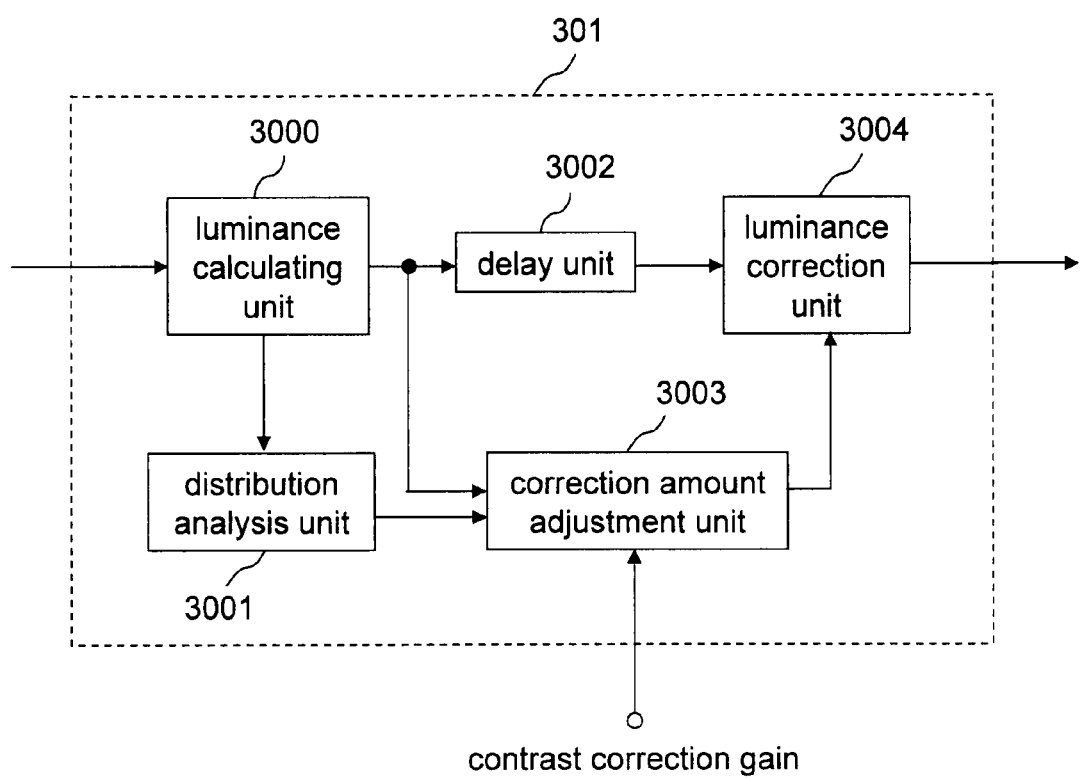
FIG. 12 is a block diagram of the contrast correction unit according to the modification 1 of the first embodiment.

Referring to FIG. 12 and FIG. 13, a description will be made on a case of performing contrast correction on pixels to be processed (pixels to be a processing object in the image signal).

FIG. 12 shows a configuration diagram of the contrast correction unit 301.

As shown in FIG. 12, the contrast correction unit 301 includes a luminance calculating unit 3000 that calculates luminance from the image signal, a distribution analysis unit 3001 that obtains a histogram distribution of luminance which is calculated by the luminance calculating unit 3000 (luminance histogram distribution), a correction amount adjustment unit 3003 that calculates correction amount ΔY for correcting luminance (luminance contrast), based on the luminance histogram distribution obtained from the distribution analysis unit 3001 and the contrast correction gain output from the contrast correction gain setting unit 302. The contrast correction unit 301 further includes, for timing adjustment of the luminance correction process, a delay unit 3002 that delays the image signal output from the luminance calculating unit 3000, a luminance correction unit 3004 that performs, based on the correction amount ΔY calculated by the correction amount adjustment unit 3003, luminance correction process on the image signal output from the delay unit 3002.

In other words, the contrast correction unit 301 acquires the luminance of the pixel to be processed, acquires the correction amount ΔY for correcting luminance contrast based on the luminance histogram distribution, and adds it to the luminance of the pixel to be processed, thereby performing the contrast correction.

Instead of obtaining the luminance histogram distribution by the distribution analysis unit 3001, based on luminance low-pass filter value (blur pixel value) showing the overall luminance distribution of the pixel area surrounding the pixels to be processed (an area having the size of approximately 1/6 to 1/3 of the total image region (the total image region of one image constituted by pixels (for example, an image of one frame))) and luminance value of the pixel to be processed, the correction amount adjustment unit 3003 can acquire the contrast correction amount ΔY. In this case, the contrast correction gain at the contrast correction unit 301 is obtained by the contrast correction gain setting unit 302 having a LUT (LUT that outputs the contrast correction gain in accordance with the depth data and depth degree) which realizes the characteristics shown in FIG. 15, for example. Then, in accordance with the obtained contrast correction gain, the correction amount ΔY for performing the contrast correction process on the image signal is calculated by the correction amount adjustment unit 3003. Then, the contrast correction amount ΔY calculated by the correction amount adjustment unit 3003 is added to the image signal (luminance of the pixel to be processed) output from the delay unit 3002 by the luminance correction unit 3004, thereby performing the correction process.

Figure 15A:
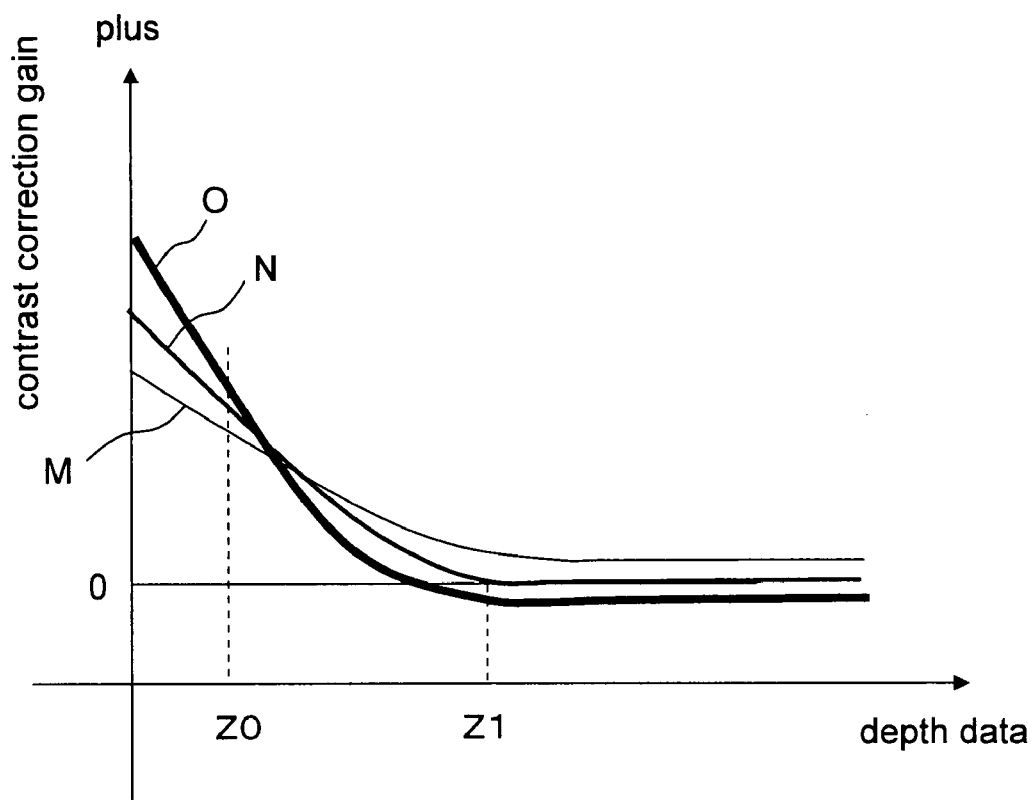
FIG. 15 is a view of the relationship between the depth data and the contrast correction gain.

As shown in FIG. 15A, the contrast enhancement process is performed on an area in the image whose depth data corresponds to the foreground, and the contrast suppression process is performed on an area in the image whose depth data corresponds to the background.

Although in FIG. 15A, the contrast suppression can be performed, too, by changing the contrast correction addition amount ΔY from positive to negative in a background where the depth data Z is larger than Z1, the present invention is not limited to this example. For example, explicitly, by dividing process for the foreground when it is judged that the pixel to be processed is contained in the foreground area from a process for the background when the pixel to be processed is contained in the background area by the depth data Z, the process to be performed on the processing pixel can be changed, i.e., performing the contrast enhancement process or the contrast suppression process.

Figure 15B:
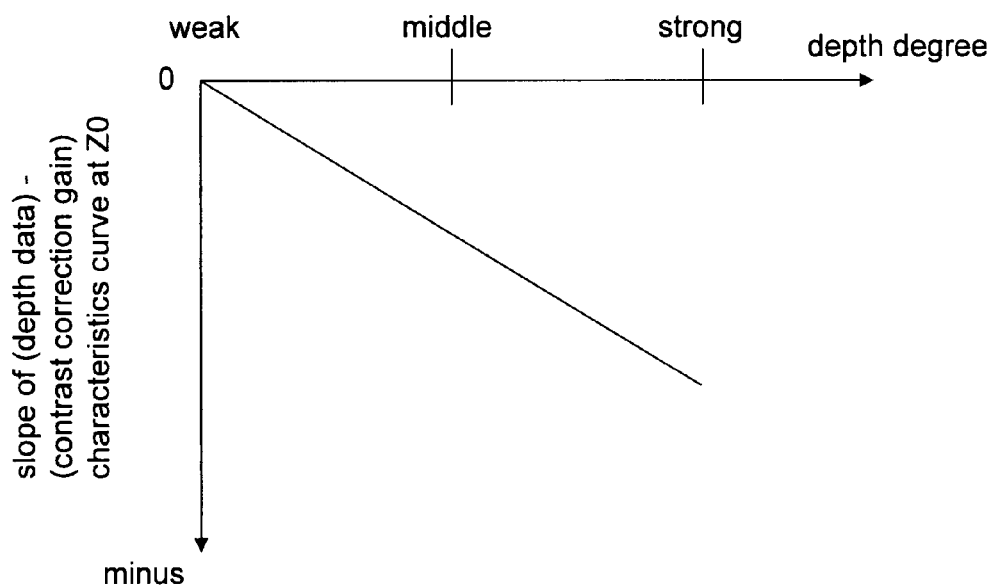

As shown in FIG. 15B, as the depth degree instructed by the interface or the like increases from "weak" to "middle", the slope of the depth data-contrast correction gain characteristics curve when the depth data Z=Z0 monotonically decreases. In other words, as the depth degree increases from "weak" to "middle", the depth data-contrast correction gain characteristics curve is changed, as shown in FIG. 15A, from curve M to curve N, further to curve O.

Figure 15C:
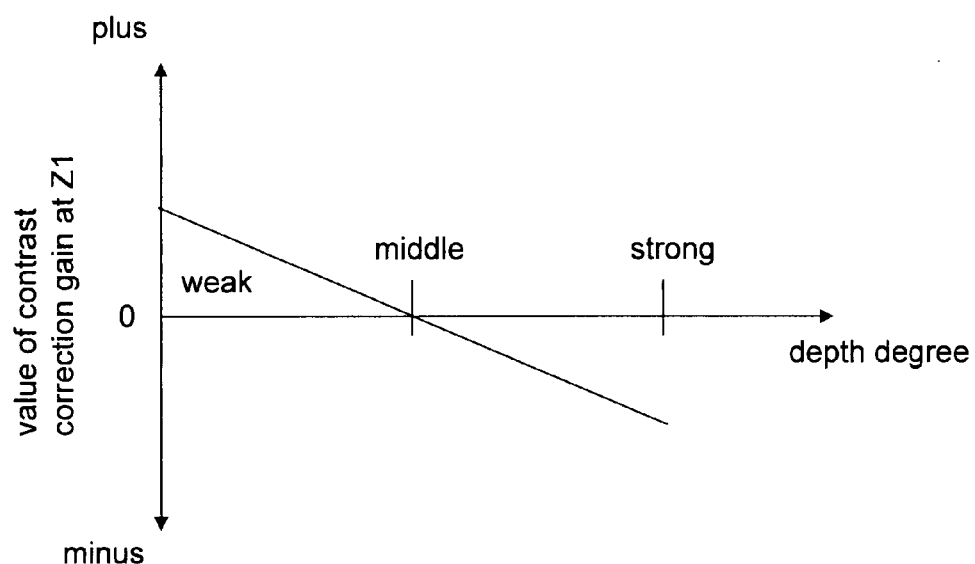

As shown in FIG. 15C, as the depth degree increases from "weak" to "middle", the depth data-contrast correction gain characteristics curve is changed from curve M to curve N, further to curve O, and the value of contrast correction gain when the depth data Z=Z1 monotonically decreases from positive to negative. FIG. 15C shows characteristics in a case that the default value of the depth degree is "middle", and is characteristics in which the value of the contrast correction gain when the depth data Z=Z1 is "0" if the depth degree is "middle".

In the image processor according to the modification 1, by changing the depth data-contrast correction gain characteristics as described above, it is possible to enhance depth feeling effect in the processing image. In other words, in the image processor according to the modification 1, the degree of the contrast enhancement is slowly changed in response to the depth data Z when the depth degree is changed from "weak" to "middle" to realize the depth feeling effect in the processing image, and as the depth degree is changed from "middle" to "strong", the contrast enhancement in the foreground on the image is further enhanced, and the contrast feel in the background view area on the image is suppressed, thereby controlling to further enhance the depth feeling effect.

In the image processor according to the modification 1, although value of the contrast correction gain when the depth data Z=Z1 in FIG. 15A and FIG. 15C is set to be negative value to perform the contrast suppression process, the value of the contrast correction gain when the depth data Z=Z1 can be converged to the predetermined lowest gain value or "0".

However, if the depth degree is "strong", in order to enhance the depth feeling effect in the processing image, it is preferable to employ the characteristics shown in FIG. 15A. The reason is that in the image processor according to the modification 1, the depth feeling effect can be further enhanced by controlling with the characteristics shown in FIG. 15A.

(Modification 2)

Next, a description will be made on the modification 2 of the image processor 100 according to the present embodiment.

The modification 2 is characterized as performing shadow correction process on the image signal. Other structures will not be described because they are similar to those in the above-described embodiment.

Figure 17:
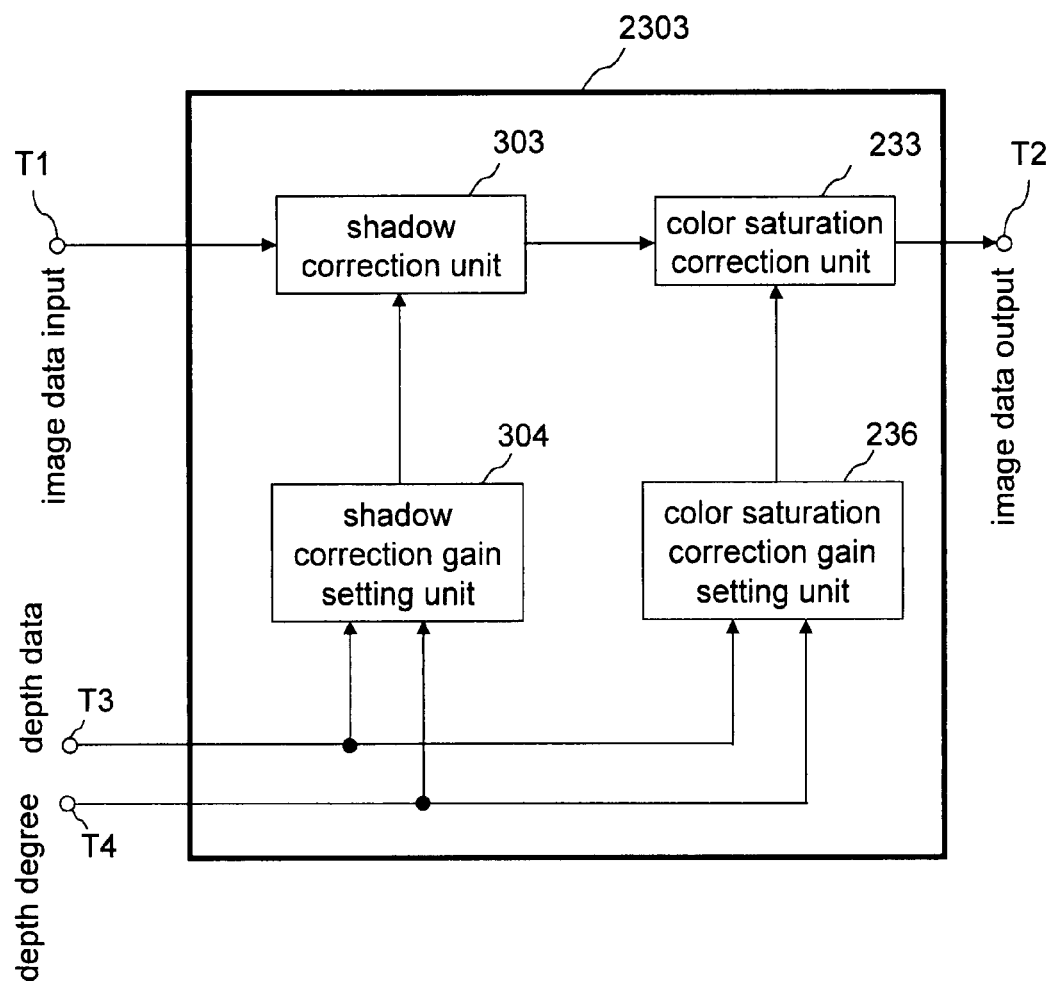
FIG. 17 is a block diagram of the depth feeling correction unit according to the modification 2 of the first embodiment.

The image processor according to the modification 2 can be realized, in the image processor 100 of the first embodiment, by replacing the depth feeling correction unit 230 into a depth feeling correction unit 2303 shown in FIG. 17.

Figure 18:
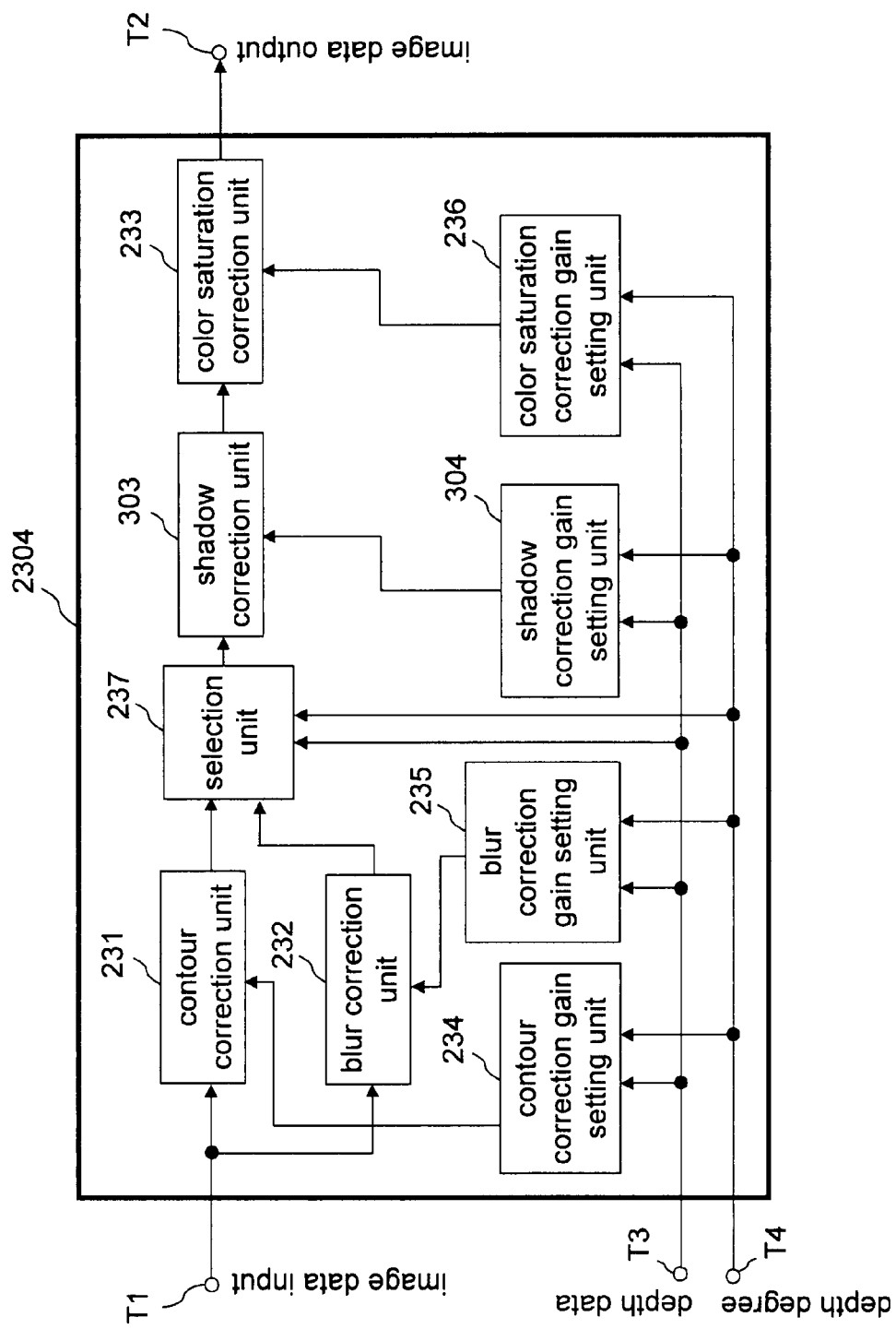
FIG. 18 is a block diagram of the depth feeling correction unit according to the modification 2 of the first embodiment.

Alternatively, the image processor according to the modification 2, can be realized by replacing, in the image processor 100 of the first embodiment, the depth feeling correction unit 230 into a depth feeling correction unit 2304 shown in FIG. 18.

Alternatively, in the image processor according to the modification 2, in the image processor 100 of the first embodiment, the contour correction unit 231 of the depth feeling correction unit 230 can be replaced into a shadow correction unit 303, and the contour correction gain setting unit 234 can be replaced into the shadow correction gain setting unit 304.

Figure 16:
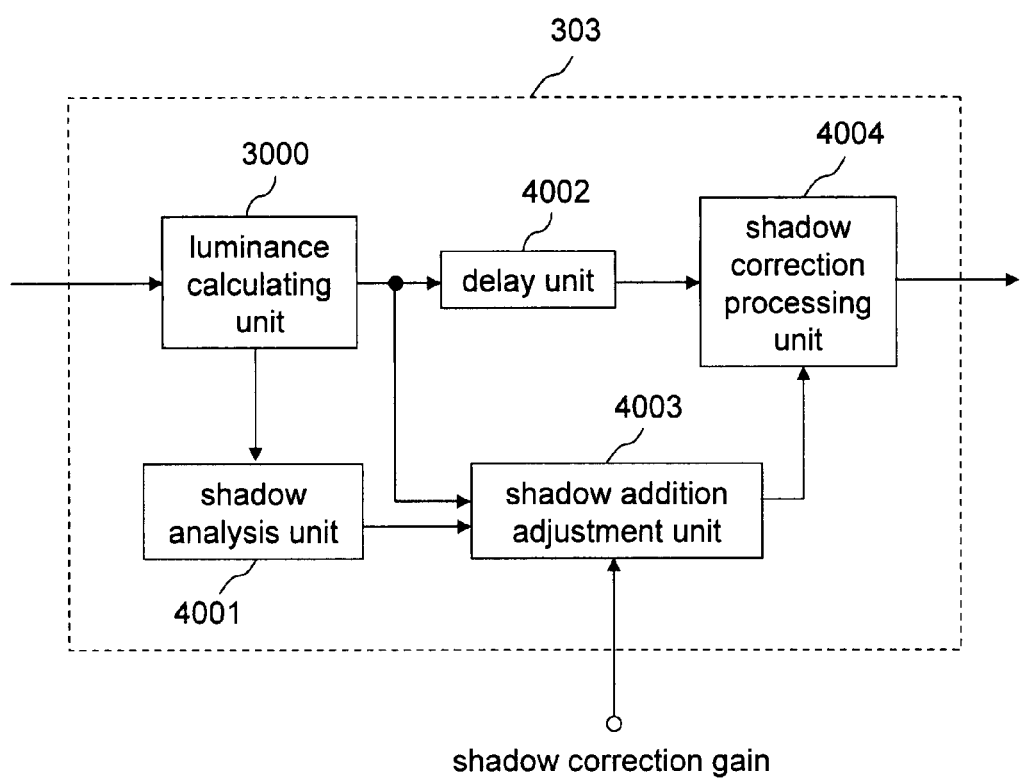
FIG. 16 is a block diagram of the shadow correction unit according to the modification 2 of the first embodiment

Referring to FIG. 16 and FIG. 17, a description will be made on a case of performing the shadow correction on the pixel to be processed.

FIG. 16 shows a configuration diagram of the shadow correction unit 303.

As shown in FIG. 16, the shadow correction unit 303 includes the luminance calculating unit 3000 that calculates luminance in accordance with the image signal, a shadow analysis unit 4001 that performs shadow analysis in accordance with the luminance calculated by the luminance calculating unit 3000, a shadow addition adjustment unit 4003 that calculates, based on a result of shadow analysis by the shadow analysis unit 4001 and the shadow correction gain output by the shadow correction gain setting unit 304, correction amount ΔY as negative value which is used to correct the luminance of the image signal. The shadow correction unit 303 further includes a delay unit 4002 that delays, for timing adjustment of the shadow correction process, delays the image signal output from the luminance calculating unit 3000, and a shadow correction processing unit 4004 that performs, based on the correction amount ΔY calculated by the shadow addition adjustment unit 4003, a shadow correction process on the image signal output from the delay unit 4002.

In other words, the process performed by the shadow correction unit 303 realizes depth feeling effect by enhancing the shadow of the pixels in the image. "Enhancing the shadow" corresponds to functions of acquiring the correction amount ΔY of the luminance Y on the pixel to be processed as negative value and adding ΔY to the luminance Y.

As shown in FIG. 16, the shadow correction unit 303 can acquire the luminance Y of the pixel to be processed first, and performs the shadow analysis on the pixel to be processed in accordance with the luminance. In this case, it may be judged whether or not there is a shadow by referring to overall luminance distribution of the pixel area surrounding the pixels to be processed (an area having the size of approximately 1/6 to 1/3 of the total image region), and the shadow portion may be enhanced. Alternatively, it is possible to estimate normal vector information indicating three-dimensional shape of the pixel to be processed (for example, in accordance with derivative value in the X axis and derivative value in the Y axis in the pixel to be processed, the three-dimensional shape can be estimated so that a normal vector of the estimated three-dimensional shape (three-dimensional curved surface) can be estimated), and to perform the shadow addition of the desired portion based on the normal vector information (It is also possible to control the shadow addition to the pixel to be processed in accordance with a positional relationship between the pixel position of the pixel to be processed and a predetermined light source or a light position analyzed in the image, and the estimated normal vector.).

The shadow addition adjustment unit 4003 calculates the correction amount $\Delta Y$ (<0) with which the shadow correction is performed on the image signal, based on the result of shadow analysis generated by the shadow analysis unit 4001 and the shadow correction gain determined by a shadow correction gain setting unit 304 in accordance with the characteristics shown in FIG. 19, for example. Then, the shadow correction unit 303 adds the correction amount $\Delta Y$ (<0) calculated by the shadow addition adjustment unit 4003 to the luminance Y of the pixel to be processed to perform the shadow correction process.

Figure 19A:
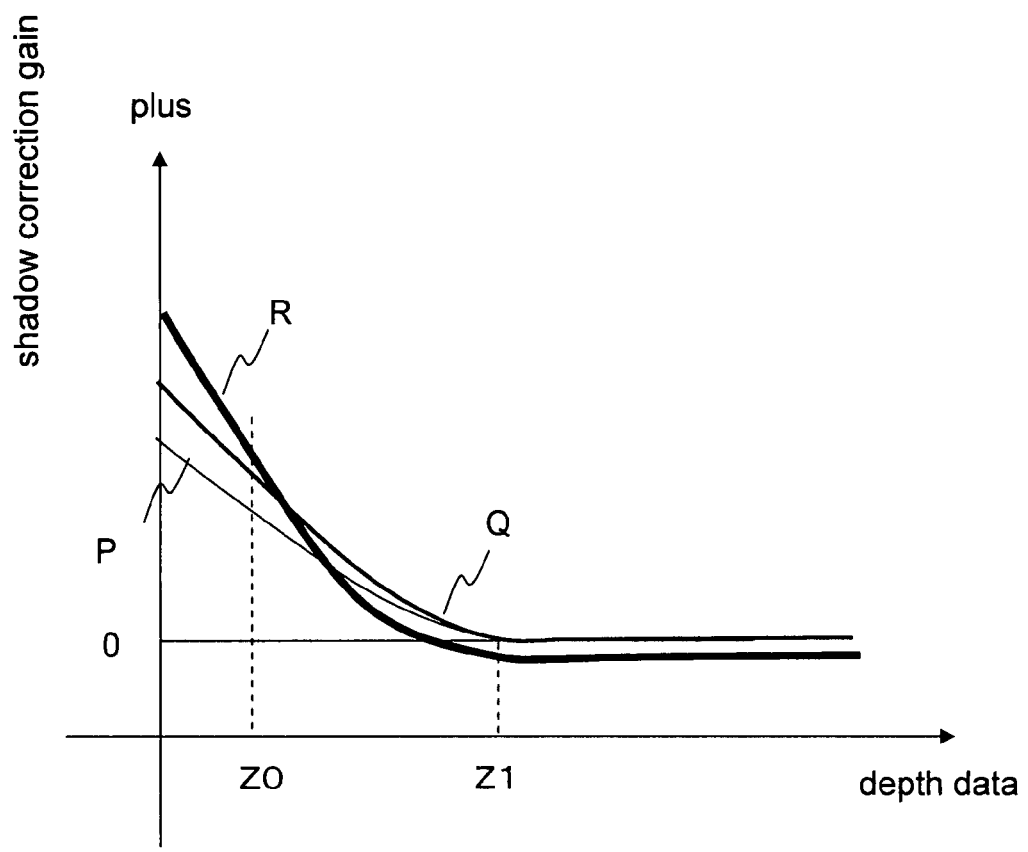
FIG. 19 is a view of the relationship between the depth data and the shadow correction gain.

As shown in FIG. 19A, the shadow enhancement process is performed on an area of in the image whose depth data corresponds to the foreground, and the shadow suppression process is performed on an area in the image whose depth data corresponds to the background.

In FIG. 19A, although the shadow suppression process is performed by the luminance addition, by changing the gain of shadow correction amount $\Delta Y$ from positive to negative in the background where the depth data Z larger than Z1, it is possible to explicitly make changes between processes performed when the depth data Z indicates the foreground, or between processes performed when the depth data Z indicates the background.

Figure 19B:
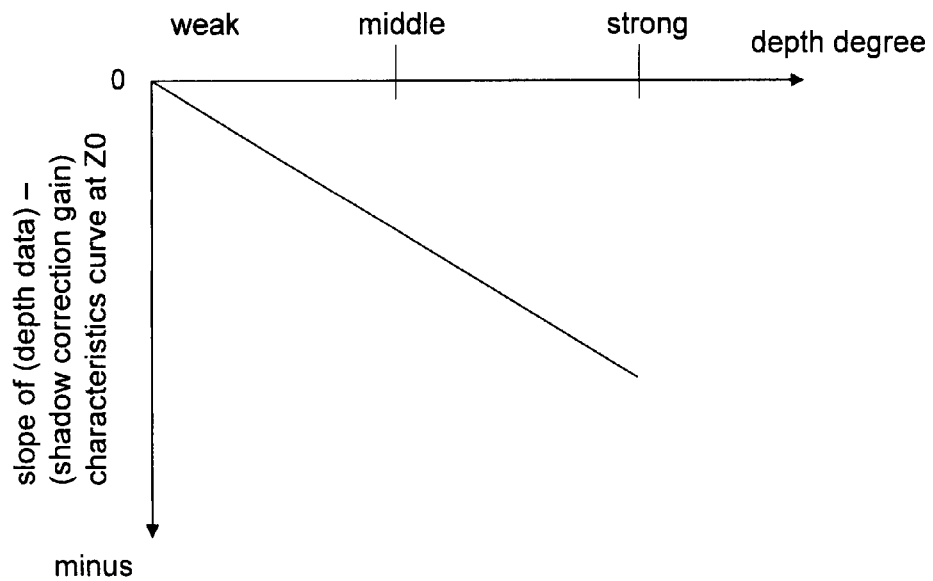

As shown in FIG. 19B, as the depth degree instructed by the interface or the like increases form "weak" to "middle", the slope of depth data-shadow correction gain characteristics where the curve depth data Z=Z0 monotonically decreases. In other words, as the depth degree increases from "weak" to "middle", the depth data-shadow correction gain characteristics curve changes, as shown in FIG. 19A, from curve P to curve Q, further to curve R. In the image processor according to the modification 2, with the depth data-shadow correction gain characteristics curve, the shadow correction gain is determined and the shadow correction process is performed, so that it is possible to further clarify the difference between the shadow corrections for the depth data Z.

Figure 19C:
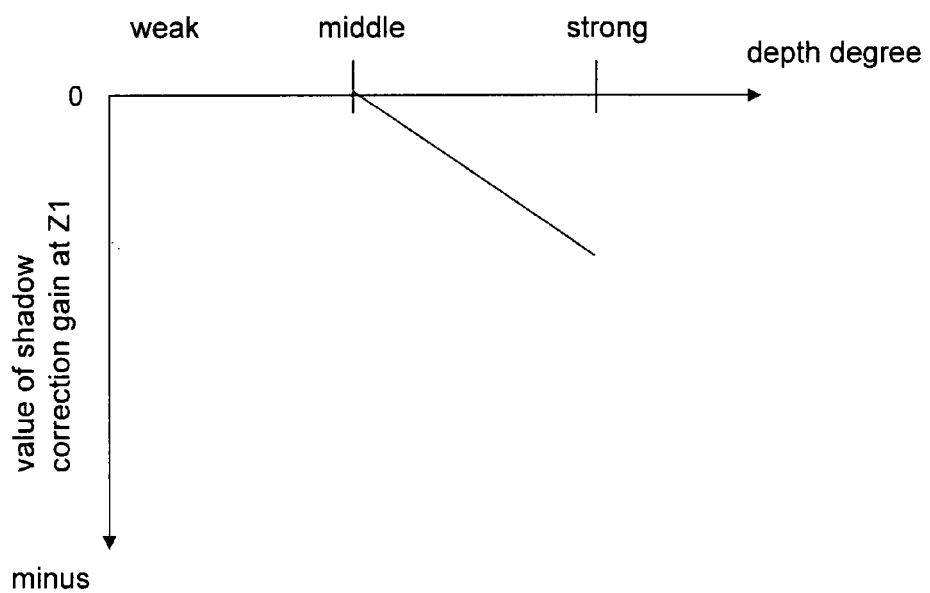

In the image processor according to the modification 2, as shown in FIG. 19C, the value of the shadow correction gain where the depth data Z=Z1 is set to "0" in the range from "weak" to "middle" (during the change from curve P to curve Q) to control the shadow correction not to be performed in an area backward of an area where the depth data Z=Z1 or the depth data is larger than Z1. In contrast, in the image processor according to the modification 2, as the depth degree is changed from "middle" to "strong", value of the shadow correction gain when the depth data Z=Z1 is monotonically decreased from "0" to perform the shadow suppression in place of the shadow enhancement.

In the image processor according to the modification 2, by changing the depth data-shadow correction gain characteristics as described above, it is possible to enhance the depth feeling effect of the processing image. In other words, in the image processor according to the modification 2, during the depth degree is in the range between "weak" to "middle", by slowly changing the degree of the shadow enhancement in response to the depth data Z, the depth feeling effect is realized; and as the depth degree is changed from "middle" to "strong", the shadow enhancement in the foreground area is further enhanced; and the shadow suppression is performed to suppress the stereoscopic effect in the background area, thereby enhancing the depth feeling effect.

Although the shadow suppression process is performed by setting value of the shadow correction gain to the negative value (setting the correction amount $\Delta Y$ to the positive value) where depth data Z=Z1 in FIG. 19A and FIG. 19C, the value of the shadow correction gain when the depth data Z=Z1 can be converged to the predetermined lowest gain value or "0".

In the image processor 100 of the present embodiment, although only the process for a near view is performed until the depth degree reaches the predetermined value, the present invention is not limited to this example. Only the process for a distant view can be performed until the depth degree reaches the predetermined value.

Furthermore, in the image processor 100, it is possible to realize a variety of combinations of pairs of image processing to be performed on a near view area and distant area in the image (the contour correction and the blur correction, and the color saturation enhancement and color saturation suppression, for example). In any case, the adjustment of the image processing can be performed as the adjustment of the depth degree by the one-dimensional scale as described in the present embodiment.

In the image processor according to the present embodiment, although the depth degree can be adjusted, the present invention is not limited to this example. For example, the depth feeling correction can be performed by on-off control of using "do" and "not do".

In the image processor according to the present embodiment, although the user can explicitly adjust the depth degree, the present invention is not limited to this example. The depth degree can be decided according to a display mode used for displaying the video on a slim TV (such as a cinema mode to attach importance to black tones and color reproduction suitable for cinema display, a dynamic mode to realize high luminance and well-defined one suitable for the display in a room with a strong environment light or at shops, and a standard display mode for displaying the image normally).

Other Embodiments (Other Modified Examples)

It should be noted that the present invention has been described based on the above embodiments, but the invention is of course not limited to the embodiments discussed above. The invention is also inclusive of the following cases.

(1) The above devices specifically are computer systems made from a microprocessor, ROM, and RAM, for instance. The RAM stores a computer program. The microprocessor operates in accordance with the computer program, allowing each device to achieve its function. Here, in order to achieve a predetermined function, the computer program is arrived at by combining a plural number of command codes for indicating an order to the computer.

(2) Some or all of the structural elements making up the devices discussed above can be constituted by a single system LSI (Large Scale Integration). The system LSI is a multifunctional LSI that is produced by integrating a plurality of structural portions on a single chip, and specifically is a computer system that is constituted by a microprocessor, ROM, and RAM, for instance. The RAM stores a computer program. The microprocessor operates in accordance with the computer program, allowing the system LSI to achieve its function.

(3) Some or all of the structural elements making up the devices discussed above can be constituted by an IC card or a single module that can be attached to and detached from the devices. The IC card or the module is a computer system that is constituted by a microprocessor, ROM, and RAM, for instance. The IC card or the module may also include the multifunctional LSI discussed above. The microprocessor operates in accordance with a computer program, allowing the IC card or the module to achieve its function. It is also possible for the IC card or the module to be tamper-resistant.

(4) The invention also may be the methods indicated in the above discussion. It is possible for these methods to be a computer program that is achieved by a computer, or a digital signal that is made from the computer program. The invention also may be a computer-readable recording medium, such as a flexible disk, a hard disk, a CD-ROM, a MO, a DVD, a DVD-ROM, a DVD-RAM, a BD (Blu-ray Disc), or a semiconductor memory, on which the computer program or the digital signal is stored. The invention also may be the digital signal stored on these recording media.

The invention can be the computer program or the digital signal transferred via an electronic transmission line, a wireless or a wired communications line, a network such as the internet, or a data broadcast.

It is also possible for the invention to be a computer system provided with a microprocessor and a memory, in which the memory stores the computer program, and the microprocessor is operated according to the computer program.

By storing the program or the digital signal on a recording medium that is then transported, or by sending the program or the digital signal via a network, for example, it is possible to run the program or the digital signal on independent, separate computer systems.

(5) It is possible to combine the embodiments and the modified examples.

Each of the processing functions explained in the aforementioned embodiments may be carried out by hardware, or by software. Alternatively, it may be carried out by mixed processing using the hardware and software.

It goes without saying that it is necessary to adjust timing for each processing when the image processing device described in the foregoing embodiments is realized by hardware. In the foregoing embodiments, for the sake of convenience the timing adjustment of each signal that is necessary for hardware design was not be described in detail.

It should be noted that the specific configuration of the invention is not limited to the foregoing embodiments, and various changes and modifications are possible in a range that does not depart from the gist of the invention.

Image processors, image processing methods, programs, storage media and integrated circuits according to the present invention are characterized in that the user can designate the depth feeling degree, and are applicable to the image processing in the display system such as TV. They can be also applied to the use of enhancing the depth feeling as post processes for movies shot by individuals, DVDs, or videos.

What is claimed is:

1. An image processor comprising:
an image data input unit to which an image data signal is input that can form an image constituted by pixels;
a depth data input unit to which depth data is input that corresponds to the image data signal;
a depth degree input unit to which a one-dimensional signal is input that is used to control depth feeling of the image formed by the image data signal;
a depth feeling correction unit configured for performing depth feeling correction on the image data signal based on the one-dimensional signal; and
a processor configured to control at least one of the image data input unit, the depth data input unit, the depth degree input unit, and the depth feeling correction unit,
wherein, if the one-dimensional signal is equal to or smaller than a predetermined value, the depth feeling correction unit performs only a correction process for a near view area on the image data signal, and
wherein, if the one-dimensional signal is larger than the predetermined value, the depth feeling correction unit performs the correction process for the near view area and a correction process for a distant view area on the image data signal.

2. An image processor according to claim 1,
wherein the depth feeling correction unit includes:
a contour correction gain setting unit configured for setting a contour correction gain based on the depth data and the one-dimensional signal;
a contour correction unit configured for performing contour correction on the image data signal based on the contour correction gain;
a blur correction gain setting unit configured for setting a parameter for blur correction based on the depth data and the one-dimensional signal;
a blur correction unit configured for performing blur correction on the image data signal based on the parameter for blur correction; and
a selection unit configured for selecting, based on the depth data and the one-dimensional signal, one of (i) the image data signal that is corrected by the contour correction unit and (ii) the image data signal that is corrected by the blur correction unit.

3. An image processor according to claim 2,
wherein the contour correction gain setting unit sets the contour correction gain such that as a value of the one-dimensional signal increases, a difference increases between a contour correction gain for a near view area on the image where a value of the depth data is small and a contour correction gain for a distant view area on the image where the value of the depth data is large.

4. An image processor according to claim 2,
wherein the blur correction gain setting unit sets the parameter for blur correction such that, if the depth data is in a range from Z0 to Z2 where Z2 is greater than Z0, regardless of a value of the one-dimensional signal, the blur process is not performed, and
wherein, the blur correction gain setting unit sets the parameter for blur correction such that, if the depth data exceeds Z2, as the value of the one-dimensional signal increases, a difference increases between a degree of the blur process when the value of the depth data is Z2 and a degree of the blur process when the value of the depth data is Z1, in which Z1 is greater than Z2.

5. An image processor according to claim 2,
wherein the selection unit (i) selects the image data signal corrected by the contour correction unit if the value of the one-dimensional signal is equal to or smaller than a first value ZT, (ii) selects the image data corrected by the contour correction unit if the value of the one-dimensional signal is larger than the first value ZT and the value of the depth data is equal to or smaller than a first depth data value Z2, and (iii) selects the image data signal corrected by the blur correction unit if the value of the one-dimensional signal is larger than the first value ZT and the value of the depth data is larger than the first depth data value Z2.

6. An image processor according to claim 2,
wherein the depth feeling correction unit further includes:
a color saturation correction gain setting unit configured for setting a color saturation correction gain based on the depth data and the one-dimensional signal; and
a color saturation correction unit configured for performing color saturation correction on the image data signal based on the color saturation correction gain.

7. An image processor according to claim 6,
wherein the color saturation correction gain setting unit sets the color saturation correction gain such that as a value of the one-dimensional signal increases, a difference increases between a color saturation correction gain for a near view area in the image where a value of the depth data is small and a color saturation correction gain for a distant view area in the image where the value of the depth data is large.

8. An image processor according to claim 1,
wherein the depth feeling correction unit includes:
a contrast correction gain setting unit configured for setting a contrast correction gain based on the depth data and the one-dimensional signal; and
a contrast correction unit configured for correcting the image data signal based on the contrast correction gain.

9. An image processor according to claim 8,
wherein the contrast correction gain setting unit sets the contrast correction gain such that as a value of the one-dimensional signal increases, a difference increases between a contrast correction gain for a near view area in the image where a value of the depth data is small and a contrast correction gain for a distant view area in the image where the value of the depth data is large.

10. An image processor according to claim 1,
wherein the depth feeling correction unit includes:
a shadow correction gain setting unit configured for setting a shadow correction gain based on the depth data and the one-dimensional signal; and
a shadow correction unit configured for performing shadow correction on the image data signal based on the shadow correction gain.

11. An image processor according to claim 10,
wherein the shadow correction gain setting unit sets the shadow correction gain such that as a value of the one-dimensional signal increases, a difference increases between a shadow correction gain for a near view area in the image where a value of the depth data is small and a shadow correction gain for a distant view area in the image where the value of the depth data is large.

12. An image processor according to claim 1,
wherein the depth feeling correction unit performs an edge enhancement process as a near view area correction process for the image data signal, and performs a blur correction process as a distant view area correction process for the image data signal.

13. An image processor according to claim 1,
wherein the depth feeling correction unit performs a color saturation enhancement process as a near view area correction process for the image data signal, and performs a color saturation lowering process as a distant view area correction process for the image data signal.

14. An image processor according to claim 1,
wherein the depth feeling correction unit enlarges, as a value of the one-dimensional signal increases, a difference between a correction amount of the image data signal corresponding to pixels in the nearest view on the image and a correction amount of the image data signal corresponding to pixels in the farthest view on the image.

15. An image processor according to claim 1,
wherein the depth feeling correction unit keeps constant, regardless of a value of the one-dimensional signal, a difference between a correction amount of the image data signal corresponding to pixels in the nearest view on the image and a correction amount of the image data signal corresponding to pixels in the farthest view on the image.

16. An image processor according to claim 1,
wherein the depth feeling correction unit performs a correction process on a predetermined feature amount of the image based on the one-dimensional signal.

17. An image processor according to claim 16,
wherein the image, which is formed by the image data signal, includes a first area and a second area that are distinguishable by the depth data, and
wherein the depth feeling correction unit performs a correction process on a portion of the image data signal corresponding to the first area by controlling a degree of enhancement of the correction process, and performs a correction process on a portion of the image data signal corresponding to the second area by controlling a degree of suppression of the correction process.

18. An image processor according to claim 17,
wherein the depth feeling correction unit performs the correction process on the portion of the image data signal corresponding to the first area by controlling a degree of enhancement of the correction process based on the one-dimensional signal, and
wherein the depth feeling correction unit performs the correction process on the portion of the image data signal corresponding to the second area by controlling a degree of suppression of the correction process based on the one-dimensional signal.

19. An image processor according to claim 17,
wherein the depth feeling correction unit performs an edge enhancement process on the portion of the image data signal corresponding to the first area, and performs a blur correction process on the portion of the image data signal corresponding to the second area to blur contours.

20. An image processor according to claim 17,
wherein the depth feeling correction unit performs a color saturation enhancement process on the portion of the image data signal corresponding to the first area, and performs a color saturation lowering process on the portion of the image data signal corresponding to the second area.

21. An image processor according to claim 17,
wherein the depth feeling correction unit performs a contrast enhancement process on the portion of the image data signal corresponding to the first area, and performs a contrast suppression process on the portion of the image data signal corresponding to the second area.

22. An image processor according to claim 17, wherein the depth feeling correction unit performs a shadow enhancement process on the portion of the image data signal corresponding to the first area, and performs a shadow suppression process on the portion of the image data signal corresponding to the second area.

23. An image processor according to claim 16, wherein the image, which is formed by the image data signal, includes a first area and a second area that are distinguishable by the depth data, and
wherein the depth feeling correction unit performs a first correction process on a portion of the image data signal corresponding to the first area, and performs a second correction process on a portion of the image data signal corresponding to the second area that is different from the first correction process.

24. An image processor according to claim 23, wherein the depth feeling correction unit selects, as the first correction process, one from among four correction processes including a contour correction process, a color saturation correction process, a contrast correction process, and a shadow correction process,
wherein the depth feeling correction unit performs the selected first correction process,
wherein the depth feeling correction unit selects, as the second correction process, one correction process from among three correction processes of the four correction processes that are not selected in the first correction process, and
wherein the depth feeling correction unit performs the selected second correction process.

25. An image processor according to claim 23, wherein the depth feeling correction unit controls, based on the one-dimensional signal, an intensity of the first correction process and an intensity of the second correction process.

26. An image processing system comprising:
an image processor including
an image data input unit to which an image data signal is input that can form an image constituted by pixels,
a depth data input unit to which the depth data is input that corresponds to the image data signal,
a depth degree input unit to which a one-dimensional signal is input that is used to control depth feeling in the image formed by the image data signal, and
a depth feeling correction unit configured for performing an edge enhancement process on the image data signal in a near view area on the image if a value of the one-dimensional signal is equal to or smaller than a predetermined value, and performing an edge enhancement process on the image data signal in the near view area on the image and a blur correction process on the image data signal in a distant view area on the image if the value of the one-dimensional signal is larger than the predetermined value; and
a controller including an operation unit with which a user can input the one-dimensional signal to the depth degree input unit of the image processor by performing a one-dimensional operation.

27. An image processing method using a processor, comprising:
inputting an image data signal that can form an image constituted by pixels;
inputting depth data that corresponds to the image data signal;
inputting a one-dimensional signal to control depth feeling in an image formed by the image data signal; and
performing depth feeling correction on the image data signal based on the one-dimensional signal,
wherein, if the one-dimensional signal is equal to or smaller than a predetermined value, the performing depth feeling correction only performs a correction process for a near view area on the image data signal, and
wherein, if the one-dimensional signal is larger than the predetermined value, the performing depth feeling correction performs the correction process for the near view area and a correction process for a distant view area on the image data signal.

28. A non-transitory computer-readable readable recording medium having stored thereon a program, wherein, when executed, the program causes a computer to function as:
an image data input unit to which an image data signal is input that can form an image constituted by pixels;
a depth data input unit to which depth data is input that corresponds to the image data signal;
a depth degree input unit to which a one-dimensional signal is input that is used to control depth feeling in the image formed by the image data signal; and
a depth feeling correction unit configured for performing depth feeling correction on the image data signal based on the one-dimensional signal,
wherein, if the one-dimensional signal is equal to or smaller than a predetermined value, the depth feeling correction unit performs only a correction process for a near view area on the image data signal, and
wherein, if the one-dimensional signal is larger than the predetermined value, the depth feeling correction unit performs the correction process for the near view area and a correction process for a distant view area on the image data signal.

* * * * *